United States Patent [19]
Maeda et al.

[11] Patent Number: 5,889,752
[45] Date of Patent: Mar. 30, 1999

[54] OPTICAL PICKUP APPARATUS WITH A CROSSTALK BALANCE DETECTING CIRCUIT

[75] Inventors: Takanori Maeda; Hajime Koyanagi, both of Tsurugashima, Japan

[73] Assignee: Pioneer Electronic Corporation, Tokyo, Japan

[21] Appl. No.: 883,578

[22] Filed: Jun. 26, 1997

[30] Foreign Application Priority Data

Jul. 18, 1996 [JP] Japan ................................ 8-189370

[51] Int. Cl.⁶ ........................................................ G11B 7/00
[52] U.S. Cl. ............................................. 369/124; 369/54
[58] Field of Search ........................... 369/124, 54, 44.37, 369/44.41, 44.34, 44.32, 44.35, 44.36

[56] References Cited

U.S. PATENT DOCUMENTS

| | | | |
|---|---|---|---|
| 5,181,161 | 1/1993 | Hirose et al. ............................ | 369/124 |
| 5,400,312 | 3/1995 | Haraguchi ............................... | 369/124 |
| 5,483,515 | 1/1996 | Chang et al. ............................ | 369/44.34 |
| 5,544,141 | 8/1996 | Kawasaki ................................ | 369/44.34 |
| 5,729,514 | 3/1998 | Horigome et al. ....................... | 369/124 |

*Primary Examiner*—Thang V. Tran
*Attorney, Agent, or Firm*—Sughrue, Mion, Zinn, Macpeak & Seas, PLLC

[57] ABSTRACT

An optical pickup apparatus for properly detecting crosstalk amounts to a read signal for one track from adjacent tracks thereof and their balance. A difference between a second read signal value for one track at a time point when a first read signal value for one adjacent track is smaller than a first threshold value and a third read signal value for the other adjacent track is larger than a second threshold value and a second read signal value at a time point when the first read signal value is larger than the second threshold value and the third read signal value is smaller than the first threshold value is formed as a value indicative of a balance level of crosstalks to the second read signal. A difference between a second read signal value at a time point when the first read signal value is larger than the second threshold value and the third read signal value is larger than the second threshold value and a second read signal value at a time point when the first read signal value is smaller than the first threshold value and the third read signal value is smaller than the first threshold value is formed as a value indicative of a crosstalk amount to the second read signal.

35 Claims, 19 Drawing Sheets

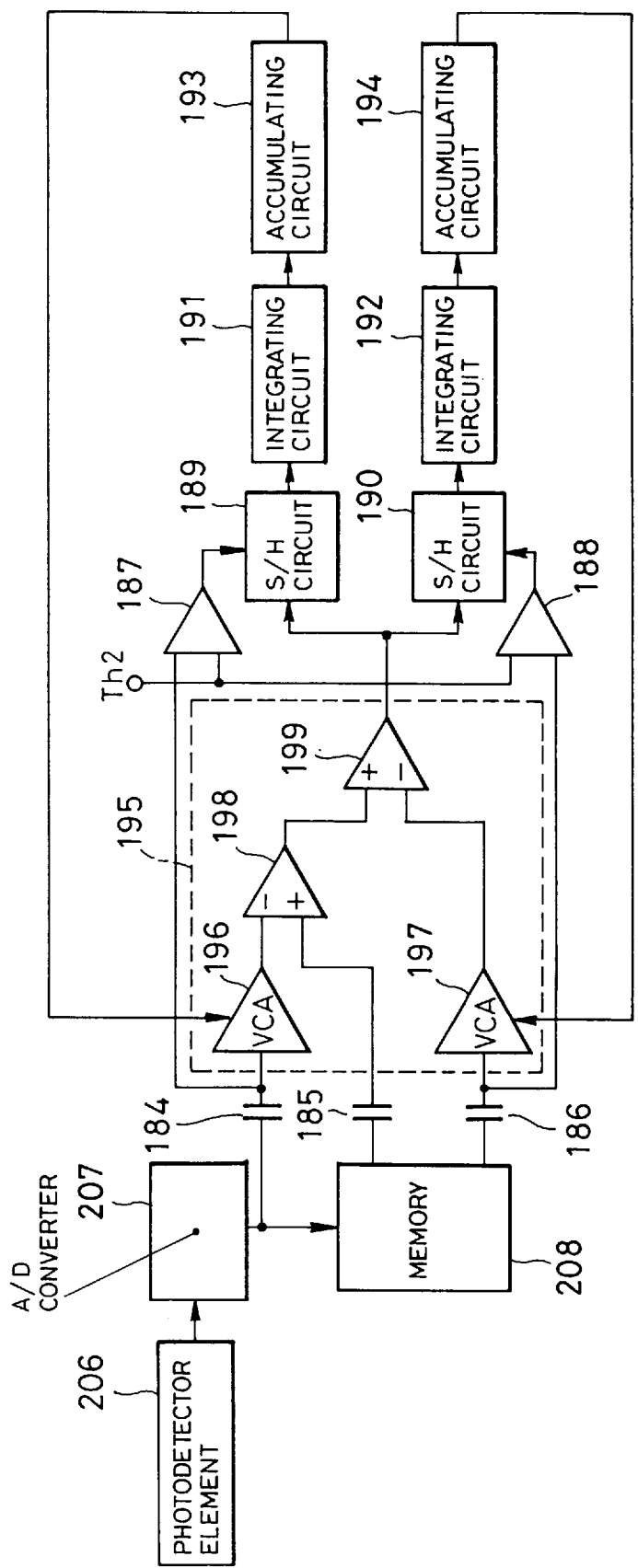

OPTICAL PICKUP APPARATUS WITH A CROSSTALK BALANCE DETECTING CIRCUIT

BACKGROUND OF THE INVENTION

1. Field of the Invention

The present invention relates to an optical pickup apparatus for writing or reading a video signal, an audio signal, or an information signal such as a computer data signal or the like to/from an optical system recording medium such as an optical disc.

2. Description of Related Art

Research into a high density recording of not only an audio signal but also an information signal including a video signal and computer data to optical discs is ongoing. For example, when an information signal including a video signal of a movie of about two hours is recorded onto an optical disc of a size equal to that of a well-known compact disc on which only the audio signal is recorded, the recording density of the optical disc has to be set fairly high. To realize a high recording density, it is considered to decrease an interval between tracks to record the information signal. If the track interval, namely a track pitch, is reduced, there arises such a problem that a crosstalk amount which is mixed into the information signal increases and a quality of a reproduction information signal deteriorates. Particularly, when the optical disc is inclined with respect to an optical axis, a situation occurs such that the crosstalk amount from one adjacent track increases and a preferable signal reproduction cannot be performed.

With a conventional pickup apparatus, so long as the reading is performed for an information signal recorded on an optical disc in which the track pitch is set at a large value, a good reading operation is achieved. It is, however, not possible to perform an accurate reading operation of the information signal from an optical disc in which a track pitch is reduced for high recording density without being adversely affected by crosstalk. Even in cases of reproducing an optical disc with a large track pitch, if the optical disc is inclined with respect to the optical axis as mentioned above, then a crosstalk amount from one adjacent track increases. The conventional pickup apparatus, therefore, has a disc tilt sensor for detecting a tilt of the disc and adjusting the optical axis to the optical disc in accordance with a tilt detection amount detected by the disc tilt sensor.

FIG. 1 shows a disc tilt sensor which is used in the conventional pickup apparatus. In this disc tilt sensor, a light emitting diode 11 generates a light beam for detecting a disc tilt and directs it to a disc 12. Photodetectors 13 and 14 are provided in the disc radial direction so as to sandwich the light emitting diode 11 and receive a reflection light from the disc 12, respectively. Light receiving level signals of the photodetectors 13 and 14 are supplied to a differential amplifier 15 and a difference between them is extracted. For example, when the right side of the disc 12 is tilted downwards, an output level of the photodetector 13 increases and an output level of the photodetector 14 decreases, so that the tilt of the disc can be detected from the level difference. An output signal of the differential amplifier 15 is supplied to a driving mechanism for adjusting the tilt of the whole pickup and the tilt of the whole pickup is automatically adjusted so as to correct the tilt detected by the disc tilt sensor.

However, since the provision of the tilt sensor and driving mechanism leads to an enlarged size of the pickup apparatus, which in turn causes the pickup itself to become unable to move at a high speed. There, consequently, is such a drawback that it is difficult to access to a target track at a high speed. Since it is necessary to accurately adjust an angle of mounting of the tilt sensor, a further drawback results that it is troublesome to perform such an adjustment at an assembling stage of the apparatus. Further, although the crosstalks from the adjacent tracks can be balanced by an output of the tilt sensor, since a crosstalk amount itself cannot be measured by the tilt sensor, a track interval cannot be reduced significantly. On the other hand, there has been proposed a method of previously recording marks to measure the crosstalk onto the tracks. However, since the marks use a predetermined capacity in a disc recording capacity irrespective of information to be recorded by the user, there is a drawback such that the capacity in which information can be recorded onto the disc is reduced.

OBJECTS AND SUMMARY OF THE INVENTION

The invention has been made to eliminate the above drawbacks and it is an object of the invention to provide an optical pickup apparatus in which crosstalk amounts from adjacent tracks into a read signal for one track and a balance of the crosstalks can be properly detected from the read signals for the tracks without recording any special signal.

According to a first aspect of the present invention, there is provided an optical pickup apparatus for optically reading signals recorded on tracks of a recording medium, comprising: signal reading device for simultaneously, individually, and optically reading the recording signals of at least three adjacent tracks on the recording medium in parallel and forming read signal values for the tracks at one end, center, and the other end of three tracks as first, second, and third read signal values, respectively; comparing device for individually comparing the first and third read signal values with a first threshold value and a second threshold value that is larger than the first threshold value; device for generating a first gate signal at a time point when the first read signal value is smaller than the first threshold value and the third read signal value is larger than the second threshold value; device for generating a second gate signal at a time point when the first read signal value is larger than the second threshold value and the third read signal value is smaller than the first threshold value; and crosstalk balance detecting device for forming a difference between the second read signal value when the first gate signal is generated and the second read signal value when the second gate signal is generated as a value indicative of a balance level of the crosstalk to the second read signal.

According to a second aspect of the invention, there is provided an optical pickup apparatus for optically reading signals recorded on the tracks of a recording medium, comprising: signal reading device for optically reading the recording signals of at least three adjacent tracks on the recording medium and forming read signal values for the tracks at one end, center, and the other end of three tracks as first, second, and third read signal values, respectively; comparing device for individually comparing the first and third read signal values with a first threshold value and a second threshold value that is larger than the first threshold value; device for generating a third gate signal at a time point when the first read signal value is larger than the second threshold value and the third read signal value is larger than the second threshold value; device for generating a fourth gate signal at a time point when the first read signal value is smaller than the first threshold value and the third read signal value is smaller than the first threshold value; and crosstalk amount detecting device for forming a difference between the second read signal value when the third gate signal is generated and the second read signal value when the fourth gate signal is generated as a value indicative of the crosstalk amount to the second read signal.

According to a third aspect of the invention, there is provided an optical pickup apparatus for optically reading signals recorded on tracks of a recording medium, comprising: signal reading device for simultaneously, individually, and optically reading the recording signals of at least three adjacent tracks on the recording medium in parallel and forming read signal values for the tracks at one end, center, and the other end of three tracks as first, second, and third read signal values, respectively; comparing device for individually comparing the first and third read signal values with a first threshold value and a second threshold value that is larger than the first threshold value; device for generating a first gate signal at a time point when the first read signal value is smaller than the first threshold value and the third read signal value is larger than the second threshold value; device for generating a second gate signal at a time point when the first read signal value is larger than the second threshold value and the third read signal value is smaller than the first threshold value; crosstalk balance detecting device for forming a difference between the second read signal value when the first gate signal is generated and the second read signal value when the second gate signal is generated as a value indicative of a balance level of the crosstalk to the second read signal; device for generating a third gate signal at a time point when the first read signal value is larger than the second threshold value and the third read signal value is larger than the second threshold value; device for generating a fourth gate signal at a time point when the first read signal value is smaller than the first threshold value and the third read signal value is smaller than the first threshold value; and crosstalk amount detecting device for forming a difference between the second read signal value when the third gate signal is generated and the second read signal value when the fourth gate signal is generated as a value indicative of the crosstalk amount to the second read signal.

According to a fourth aspect of the invention, there is provided an optical pickup apparatus for optically reading signals recorded on tracks of a recording medium, comprising: signal reading device for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively; first comparing device for generating a fifth gate signal when the first read signal value is smaller than the first threshold value; second comparing device for generating a sixth gate signal when the first read signal value is larger than the second threshold value that is larger than the first threshold value; delay device for individually delaying the fifth and sixth gate signals; a fifth sampling and holding circuit to hold and generate the second read signal value when the fifth gate signal delayed by the delay device is generated; a sixth sampling and holding circuit to hold and generate the second read signal value when the sixth gate signal delayed by the delay device is generated; selecting device for obtaining a holding output value of the fifth sampling and holding circuit when the third read signal value is larger than the second threshold value and for obtaining a holding output value of the sixth sampling and holding circuit when the third read signal value is smaller than the first threshold value; and crosstalk balance detecting device for forming a difference between the holding output values of the fifth and sixth sampling and holding circuits as a value indicative of a balance level of the crosstalk to the second read signal.

According to a fifth aspect of the invention, there is provided an optical pickup apparatus for optically reading signals recorded on tracks of a recording medium, comprising: signal reading device for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively; first comparing device for generating a fifth gate signal when the first read signal value is smaller than a first threshold value; second comparing device for generating a sixth gate signal when the first read signal value is larger than a second threshold value that is larger than the first threshold value; delay device for individually delaying the fifth and sixth gate signals; a fifth sampling and holding circuit to hold and generate the second read signal value when the fifth gate signal delayed by the delay device is generated; a sixth sampling and holding circuit to hold and generate the second read signal value when the sixth gate signal delayed by the delay device is generated; selecting device for obtaining a holding output value of the fifth sampling and holding circuit when the third read signal value is smaller than the first threshold value and for obtaining a holding output value of the sixth sampling and holding circuit when the third read signal value is larger than the second threshold value; and crosstalk amount detecting device for forming a difference between the holding output values of the fifth and sixth sampling and holding circuits obtained by the selecting device as a value indicative of a crosstalk amount to the second read signal.

According to a sixth aspect of the invention, there is provided an optical pickup apparatus for optically reading signals recorded on tracks of a recording medium, comprising: signal reading device for simultaneously, individually, and optically reading recording signals of three adjacent tracks on the recording medium by three beams and forming read signal values for the tracks at one end in a preceding reading, center, and the other end in a delay reading among the three tracks as first, second, and third read signal values, respectively; first comparing device for generating a fifth gate signal when the first read signal value is smaller than a first threshold value; second comparing device for generating a sixth gate signal when the first read signal value is larger than a second threshold value that is larger than the first threshold value; delay device for individually delaying the fifth and sixth gate signals; a fifth sampling and holding circuit to hold and generate the second read signal value when the fifth gate signal delayed by the delay device is generated; a sixth sampling and holding circuit to hold and generate the second read signal value when the sixth gate signal delayed by the delay device is generated; selecting device for obtaining a holding output value of the fifth sampling and holding circuit when the third read signal value is larger than the second threshold value and for obtaining a holding output value of the sixth sampling and holding circuit when the third read signal value is smaller than the first threshold value; crosstalk balance detecting device for forming a difference between the holding output values of the fifth and sixth sampling and holding circuits obtained by the selecting device as a value indicative of a balance level of the crosstalk to the second read signal; and crosstalk amount detecting device for forming a difference between the holding output values of the fifth and sixth sampling and holding circuits obtained by the selecting device as a value indicative of the crosstalk amount to the second read signal.

According to a seventh aspect of the invention, there is provided an optical pickup apparatus for optically reading signals recorded on tracks of a recording medium, comprising: signal reading device for optically reading a recording signal of one track on the recording medium and generating the read signal as a first read signal value; a memory to store the first read signal value generated from the signal reading device at a predetermined period; device for reading out the read signal values corresponding to reading positions which are adjacent to the present reading position by the signal reading device by one track and two tracks on the side which has already been read as second and third read signal values from the plurality of first signal values stored in the memory; comparing device for individually comparing the first and third read signal values with a first threshold value and a second threshold value that is larger than the first threshold value; device for generating a first gate signal at a time point when the first read signal value is smaller than the first threshold value and the third read signal value is larger than the second threshold value; device for generating a second gate signal at a time point when the first read signal value is larger than the second threshold value and the third read signal value is smaller than the first threshold value; and crosstalk balance detecting device for forming a difference between the second read signal value when the first gate signal is generated and the second read signal value when the second gate signal is generated as a value indicative of a balance level of the crosstalk to the second read signal.

According to a eighth aspect of the invention, there is provided an optical pickup apparatus for optically reading signals recorded on tracks of a recording medium, comprising: signal reading device for optically reading the recording signal of one track on the recording medium and generating the read signal as a first read signal value; a memory to store the first read signal value generated from the signal reading device at a predetermined period; device for reading out the read signal values corresponding to reading positions which are adjacent to the present reading position by the signal reading device by one track and two tracks on the side which has already been read as second and third read signal values from the plurality of first signal values stored in the memory; comparing device for individually comparing the first and third read signal values with a first threshold value and a second threshold value that is larger than the first threshold value; device for generating a third gate signal at a time point when the first read signal value is larger than the second threshold value and the third read signal value is larger than the second threshold value; device for generating a fourth gate signal at a time point when the first read signal value is smaller than the first threshold value and the third read signal value is smaller than the first threshold value; and crosstalk amount detecting device for forming a difference between the second read signal value when the third gate signal is generated and the second read signal value when the fourth gate signal is generated as a value indicative of the crosstalk amount to the second read signal.

According to a ninth aspect of the invention, there is provided an optical pickup apparatus for optically reading signals recorded on tracks of a recording medium, comprising: signal reading device for optically reading the recording signal of one track on the recording medium and generating the read signal as a first read signal value; a memory to store the first read signal value generated from the signal reading device at a predetermined period; device for reading out the read signal values corresponding to reading positions which are adjacent to the present reading position by the signal reading device by one track and two tracks on the side which has already been read as second and third read signal values from the plurality of first signal values stored in the memory; comparing device for individually comparing the first and third read signal values with a first threshold value and a second threshold value that is larger than the first threshold value; device for generating a first gate signal at a time point when the first read signal value is smaller than the first threshold value and the third read signal value is larger than the second threshold value; device for generating a second gate signal at a time point when the first read signal value is larger than the second threshold value and the third read signal value is smaller than the first threshold value; crosstalk balance detecting device for forming a difference between the second read signal value when the first gate signal is generated and the second read signal value when the second gate signal is generated as a value indicative of a balance level of the crosstalk to the second read signal; and crosstalk amount detecting device for forming a difference between the second read signal value when the third gate signal is generated and the second read signal value when a fourth gate signal is generated as a value indicative of the crosstalk amount to the second read signal.

According to a tenth aspect of the invention, there is provided an optical pickup apparatus for optically reading signals recorded on tracks of a recording medium, comprising: signal reading device for simultaneously, individually, and optically reading the recording signals of at least three adjacent tracks on the recording medium in parallel and forming read signal values for the tracks at one end, center, and the other end among the three tracks as first, second, and third read signal values, respectively; comparing device for individually comparing the first and third read signal values with a first threshold value and a second threshold value that is larger than the first threshold value; device for generating a first gate signal when the first read signal value is smaller than the first threshold value; device for generating a second gate signal when the first read signal value is larger than the second threshold value; device for generating a third gate signal when the third read signal value is smaller than the first threshold value; device for generating a fourth gate signal when the third read signal value is larger than the second threshold value; first crosstalk amount detecting device for forming a difference between the second read signal value when the first gate signal is generated and the second read signal value when the second gate signal is generated as a value indicative of the crosstalk amount to the center track from the track at one end; and second crosstalk amount detecting device for forming a difference between the second read signal value when the third gate signal is generated and the second read signal value when the fourth gate signal is generated as a value indicative of the crosstalk amount to the center track from the track at the other end.

According to a eleventh aspect of the invention, there is provided an optical pickup apparatus for optically reading signals recorded on tracks of a recording medium, comprising: signal reading device for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively; comparing device for individually comparing the first and third read signal values with a first threshold value and a second threshold value that is larger than the first threshold value; device for generating a first gate signal when the first read signal value is smaller than the first threshold value; device for generating a second gate signal when the first read signal value is larger than the second threshold value; device for generating a third gate signal when the third read signal value is smaller than the first threshold value; device for generating a fourth gate signal when the third read signal value is larger than the second threshold value; first crosstalk amount detecting device for forming a difference between the second read signal value when the first gate signal is generated and the second read signal value when the second gate signal is generated as a value indicative of the crosstalk amount to the center track from the track at one end; and second crosstalk amount detecting device for forming a difference between the second read signal value when the third gate signal is generated and the second read signal value when the fourth gate signal is generated as a value indicative of the crosstalk amount to the center track from the track at the other end.

According to a twelfth aspect of the invention, there is provided an optical pickup apparatus for optically reading signals recorded on tracks of a recording medium, comprising: signal reading device for optically reading the recording signal of one track on the recording medium and generating the read signal as a first read signal value; a memory to store the first read signal value generated from the signal reading device at a predetermined period; reading device for reading out the read signal values corresponding to reading positions which are adjacent to the present reading position by the signal reading device by one track and two tracks on the side which has already been read as second and third read signal values from the plurality of first signal values stored in the memory; comparing device for individually comparing the first and third read signal values with a first threshold value and a second threshold value that is larger than the first threshold value; device for generating a first gate signal when the first read signal value is smaller than the first threshold value; device for generating a second gate signal when the first read signal value is larger than the second threshold value; device for generating a third gate signal when the third read signal value is smaller than the first threshold value; device for generating a fourth gate signal when the third read signal value is larger than the second threshold value; first crosstalk amount detecting device for forming a difference between the second read signal value when the first gate signal is generated and the second read signal value when the second gate signal is generated as a value indicative of the crosstalk amount to the center track from the track at one end among the three adjacent tracks; and second crosstalk amount detecting device for forming a difference between the second read signal value when the third gate signal is generated and the second read signal value when the fourth gate signal is generated as a value indicative of the crosstalk amount to the center track from the track at the other end among the three adjacent tracks.

According to a thirteenth aspect of the invention, there is provided an optical pickup apparatus for optically reading signals recorded on tracks of a recording medium, comprising: signal reading device for simultaneously, individually, and optically reading the recording signals of at least three adjacent tracks on the recording medium in parallel and forming read signal values for the tracks at one end, center, and the other end among the three tracks as first, second, and third read signal values, respectively; comparing device for individually comparing the first and third read signal values with a first threshold value or a second threshold value that is larger than the first threshold value; device for generating a first gate signal when the first read signal value is smaller than the first threshold value or is larger than the second threshold value; device for generating a second gate signal when the third read signal value is smaller than the first threshold value or is larger than the second threshold value; device for obtaining a fourth read signal value in which only an A/C component of the second read signal value is extracted; first crosstalk amount detecting device for forming the fourth read signal value when the first gate signal is generated as a value indicative of the crosstalk amount to the center track from the track at one end; and second crosstalk amount detecting device for forming the fourth read signal value when the second gate signal is generated as a value indicative of the crosstalk amount to the center track from the track at the other end.

According to a fourteenth aspect of the invention, there is provided an optical pickup apparatus for optically reading signals recorded on tracks of a recording medium, comprising: signal reading device for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively; comparing device for individually comparing the first and third read signal values with a first threshold value or a second threshold value that is larger than the first threshold value; device for generating a first gate signal when the first read signal value is smaller than the first threshold value or is larger than the second threshold value; device for generating a second gate signal when the third read signal value is smaller than the first threshold value and the first read signal value is larger than the second threshold value; device for obtaining a fourth read signal value in which only an A/C component of the second read signal value is extracted; first crosstalk amount detecting device for forming the fourth read signal value when the first gate signal is generated as a value indicative of the crosstalk amount to the center track from the track at one end; and second crosstalk amount detecting device for forming the fourth read signal value when the second gate signal is generated as a value indicative of the crosstalk amount to the center track from the track at the other end track.

According to a fifteenth aspect of the invention, there is provided an optical pickup apparatus for optically reading signals recorded on tracks of a recording medium, comprising: signal reading device for optically reading the recording signal of one track on the recording medium and generating the read signal as a first read signal value; a memory to store the first read signal value generated from the signal reading device at a predetermined period; reading device for reading out the read signal values corresponding to reading positions which are adjacent to the present reading position by the signal reading device by one track and two tracks on the side which has already been read as second and third read signal values from the plurality of first signal values stored in the memory; comparing device for individually comparing the first and third read signal values with a first threshold value or a second threshold value that is larger than the first threshold value; device for generating a first gate signal when the first read signal value is smaller than the first threshold value or is larger than the second threshold value; device for generating a second gate signal when the third read signal value is smaller than the first threshold value or is larger than the second threshold value; device for obtaining a fourth read signal value in which only an A/C component of the second read signal value is extracted; first crosstalk amount detecting device for forming the fourth read signal value when the first gate signal is generated as a value indicative of the crosstalk amount to the center track from the track at one end among the three adjacent tracks; and second crosstalk amount detecting device for forming the fourth read signal value when the second gate signal is generated as a value indicative of the crosstalk amount to the center track from the track at the other end among the three adjacent tracks.

BRIEF DESCRIPTION OF THE DRAWINGS

FIG. 20 is a diagram showing a crosstalk detecting circuit of a pickup apparatus using one beam according to the invention.

DETAILED DESCRIPTION OF THE PREFERRED EMBODIMENTS

An embodiment of the invention will now be described in detail hereinbelow with reference to the drawings.

Figure 1:
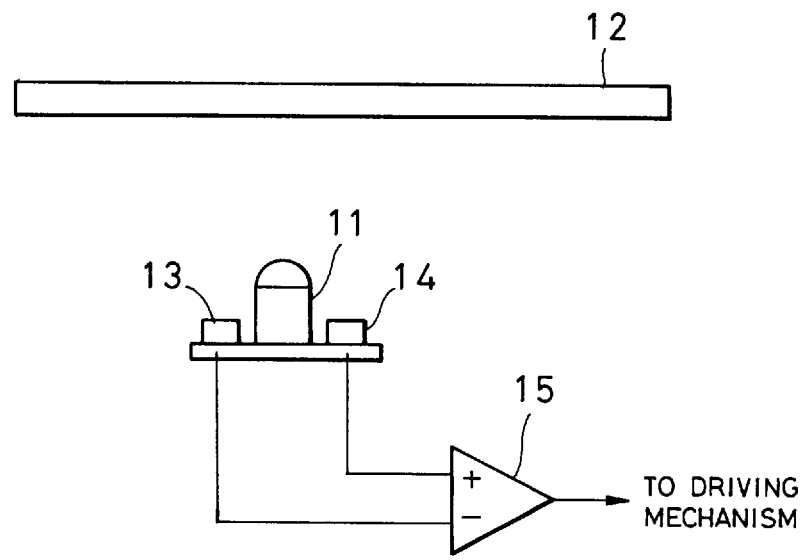
FIG. 1 is a diagram showing a disc tilt sensor which is used in a conventional pickup apparatus.
Figure 2:
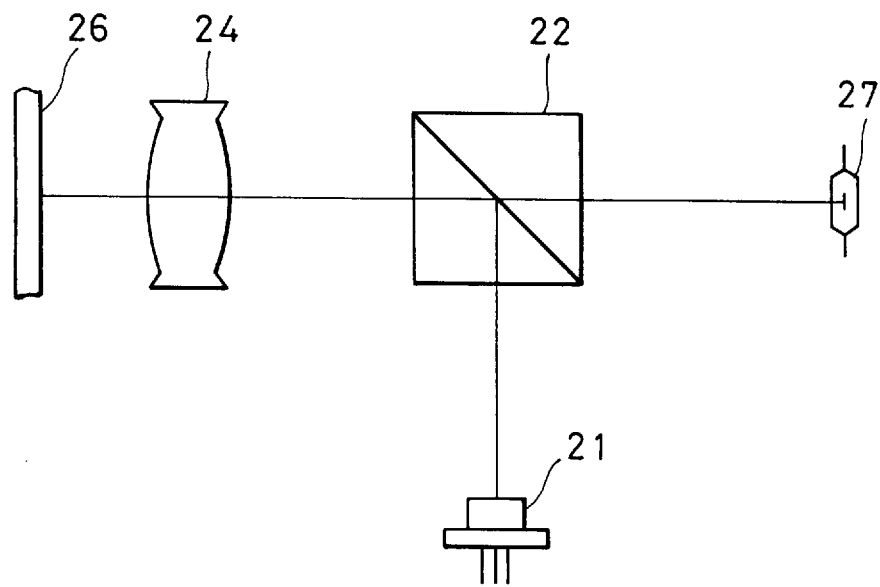
FIG. 2 is a schematic diagram showing an optical system of an optical pickup apparatus according to the invention.

FIG. 2 shows an optical system of an optical pickup apparatus which is used in an optical disc player according to the invention. In the pickup apparatus, a light source 21 is driven by a driving circuit (not shown) and emits a laser beam. The laser beam emitted from the light source 21 is reflected by a beam splitter 22 and subsequently arrives at an objective lens 24. The objective lens 24 converges the laser beam onto the recording surface of an optical disc 26. Three or more tracks are irradiated on the recording surface of the optical disc 26. The laser beam reflected by the recording surface of the optical disc 26, namely, the reflection light is converted into a parallel laser beam by an objective lens 24 and, after that, the laser beam rectilinearly passes through the beam splitter 22 and reaches a photodetector 27.

Figure 3:
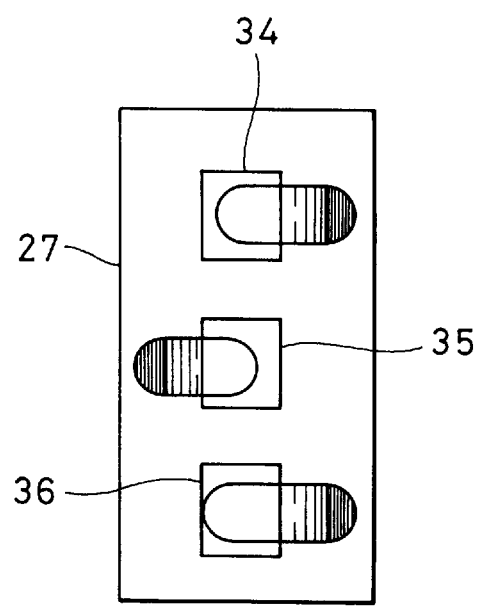
FIG. 3 is a diagram showing a light receiving surface of a photodetector.

As shown in FIG. 3, the photodetector 27 has three photo detector elements 34 to 36. The photo detector elements 34 to 36 are arranged in a line in the disc radial direction with predetermined intervals. The intervals among the photo detector elements 34 to 36 are determined in a manner such that when a track image (pit image) of one track to be read on the optical disc 26 is formed on the photo detector element 35, track images of the adjacent tracks of such one track are formed on the photo detector elements 34 and 36, respectively.

Figure 4:
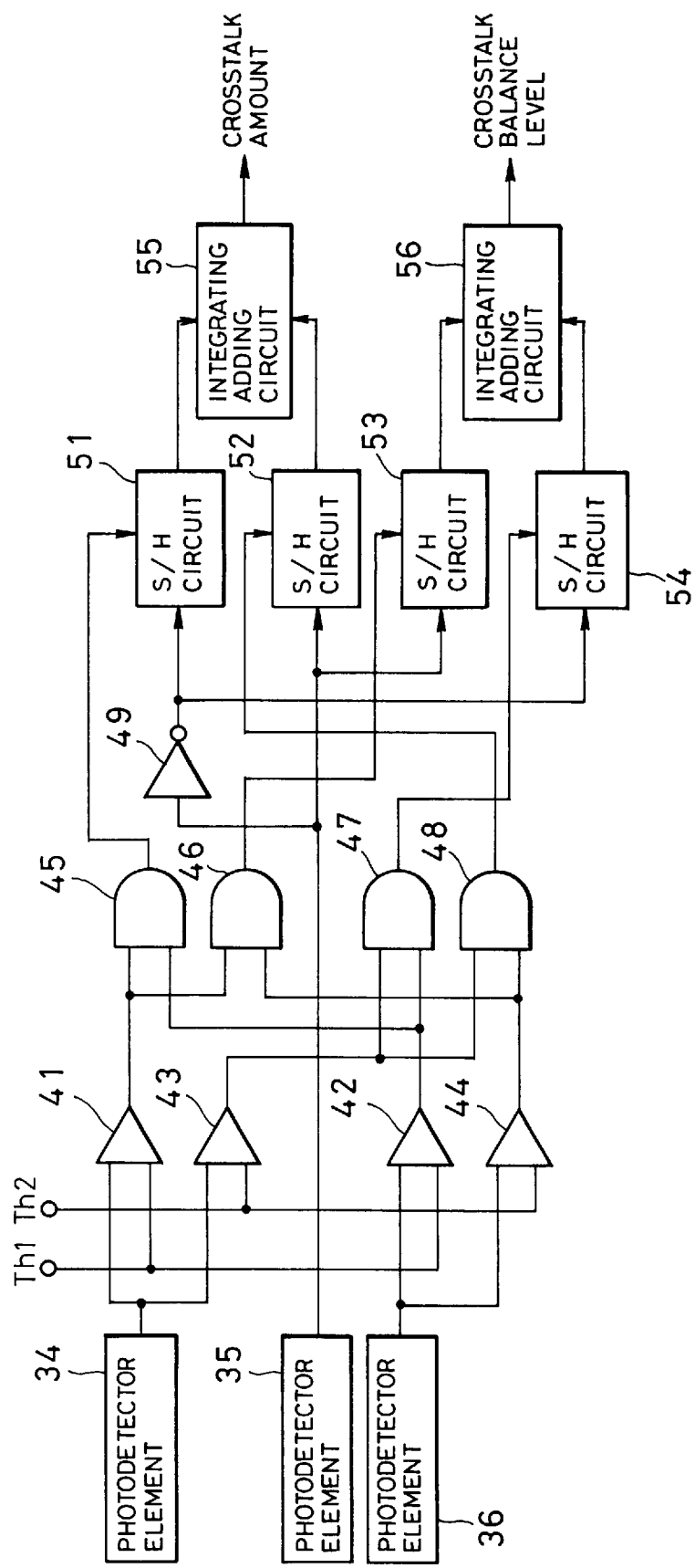
FIG. 4 is a diagram showing a crosstalk detecting circuit of the pickup apparatus according to the invention.

FIG. 4 shows a crosstalk detecting circuit connected to an output of the photodetector 27. In the crosstalk detecting circuit, an inverter 49 is connected to the photo detector element 35. The inverter 49 inverts an output level of the photo detector element 35. Two comparators 41 and 43 are connected to the photo detector element 34. Two comparators 42 and 44 are connected to the photo detector element 36. The comparator 41 compares an output level of the photo detector element 34 with a first threshold value Th1 and generates an output signal at a high level when the output level of the photo detector element 34 is smaller than Th1. The comparator 42 compares an output level of the photo detector element 36 with the first threshold value Th1 and generates an output signal at a high level when the output level of the photo detector element 36 is smaller than Th1. The comparator 43 compares the output level of the photo detector element 34 with a second threshold value Th2 and generates an output signal at a high level when the output level of the photo detector element 34 is larger than Th2. The comparator 44 compares the output level of the photo detector element 36 with the second threshold value Th2 and generates an output signal at a high level when the output level of the photo detector element 36 is larger than Th2. A logic circuit comprising AND circuits 45 to 48 is connected to outputs of the comparators 41 to 44. The AND circuit 45 gets the AND of the output levels of the comparators 41 and 42. The AND circuit 46 gets the AND of the output levels of the comparators 41 and 44. The AND circuit 47 gets the AND of the output levels of the comparators 42 and 43. The AND circuit 48 gets the AND of the output levels of the comparators 43 and 44.

Sampling and holding (S/H) circuits 51 to 54 are connected to outputs of the AND circuits 45 to 48. The S/H circuit 51 holds an output signal of the inverter 49 in response to a fourth gate signal as a high level signal output of the AND circuit 45. The S/H circuit 52 holds the output signal of the photo detector element 35 in response to a third gate signal as a high level signal output of the AND circuit 48. The S/H circuit 53 holds an output signal of the photo detector element 35 in response to a first gate signal as a high level signal output of the AND circuit 46. The S/H circuit 54 holds the output signal of the inverter 49 in response to a second gate signal as a high level signal output of the AND circuit 47. An integrating adding circuit 55 is connected to the S/H circuits 51 and 52. An integrating adding circuit 56 is connected to the S/H circuits 53 and 54. The integrating adding circuit 55 adds output values of the S/H circuits 51 and 52 and further integrates an addition value, thereby obtaining a crosstalk amount. The integrating adding circuit 56 adds output values of the S/H circuits 53 and 54 and further integrates an addition value, thereby obtaining a crosstalk balance level.

Figure 5:
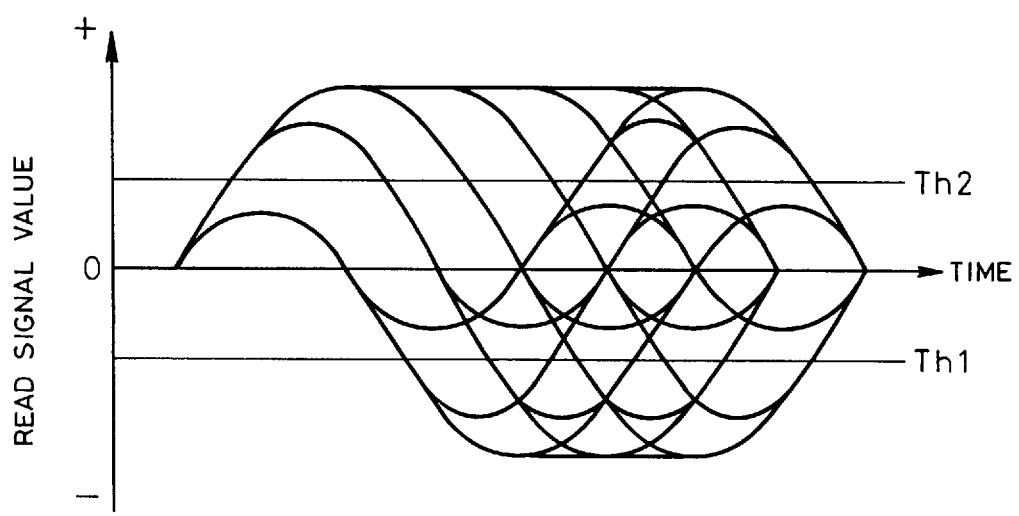
FIG. 5 is a diagram showing eye patterns of a read signal.

FIG. 5 shows an example of measured waveforms, namely, eye patterns of the read signal which is derived from, for example, the photo detector element 35 when a digital video disc is used as an optical disc 26. It will be understood from the eye patterns that between the pits of different lengths formed on the optical disc 26, their read signal amplitudes are different due to a difference between spatial frequency transfer characteristics. The first threshold value Th1 and second threshold value Th2 mentioned above are set, therefore, in consideration of a point that those amplitudes are different. That is, as shown in FIG. 5, the first threshold value Th1 is set so as to be larger than the amplitude value for the shortest pit and the second threshold value Th2 is set to a value larger than the first threshold value Th1. In the case of FIG. 5, the absolute values of the first and second threshold values Th1 and Th2 are equal. A situation itself such that the read signal amplitudes are different depending on the pit length also similarly occurs in the other optical discs such as a compact disc and the like.

The detecting operation of a crosstalk balance level will now be described as an operation of the crosstalk detecting circuit with the foregoing construction.

When the photo detector element 36 receives the reflection light from a land portion on the track and the photo detector element 35 receives the reflection light from a pit portion on the track, since the reflection light from the land portion is brighter than the reflection light from the pit portion, the output level of the photo detector element 34 is smaller than the first threshold value Th1 and the output level of the photo detector element 36 is larger than the second threshold value Th2. Each of the output levels of the comparators 41 and 44, therefore, becomes the high level and each of the output levels of the comparators 42 and 43 becomes the low level, so that the output level of the AND circuit 46 becomes the high level and each of the output levels of the other AND circuits 45, 47, and 48 becomes the low level. In this case, the S/H circuit 53 is activated in response to the high level output of the AND circuit 46, namely, the first gate signal and the S/H circuit 53 holds and generates the output signal of the photo detector element 35. The holding output is supplied to the integrating adding circuit 56.

When the photo detector element 34 receives the reflection light from the land portion on the track and the photo detector element 36 receives the reflection light from the pit portion on the track, the output level of the photo detector element 34 is larger than the second threshold value Th2 and the output level of the photo detector element 36 is smaller than the first threshold value Th1. Each of the output levels of the comparators 42 and 43, therefore, becomes the high level and each of the output levels of the comparators 41 and 44 becomes the low level, so that the output level of the AND circuit 47 becomes the high level and each of the output levels of the other AND circuits 45, 46, and 48 becomes the low level. In this instance, the S/H circuit 54 is activated in response to the high level output of the AND circuit 47, namely, the second gate signal. The S/H circuit 54 holds and generates the inversion signal by the inverter 49 of the output signal of the photo detector element 35. The holding output is supplied to the integrating adding circuit 56.

The integrating adding circuit 56 integrates a signal which is supplied from each of the S/H circuits 53 and 54 and adds integration results and outputs an addition result. Since the integrating and adding operations are performed continuously, an average value of the signal levels which are supplied from the S/H circuits 53 and 54 is added in the integrating adding circuit 56. Since the inverter 49 is provided, is actually obtained is a difference between an average value of the output signal of the photo detector element 35 which is derived when the output level of the photo detector element 34 is smaller than the first threshold value Th1 and the output level of the photo detector element 36 is larger than the second threshold value Th2 and and average value of the output signal of the photo detector element 35 which is derived when the output level of the photo detector element 34 is larger than the second threshold value Th2 and the output level of the photo detector element 36 is smaller than the first threshold value Th1.

When the crosstalk balance is obtained, a ratio which is derived when the output level of the photo detector element 34 is smaller than the first threshold value Th1 and the output level of the photo detector element 36 is larger than the second threshold value Th2 and a ratio which is derived when the output level of the photo detector element 34 is larger than the second threshold value Th2 and the output level of the photo detector element 36 is smaller than the first threshold value Th1 are almost equal, so that an addition output of the integrating adding circuit 56 is equal to a small value of about 0. When the crosstalk balance is not derived, however, for instance, as for the crosstalk amount to the photo detector element 35, so long as the crosstalk amount from the track for the photo detector element 34 is larger than that from the track for the photo detector element 36, when the photo detector element 34 receives the reflection light from the land portion on the track and the photo detector element 36 receives the reflection light from the pit portion on the track, the photo detector element 35 is influenced by the crosstalk as compared with the case opposite to that mentioned above. The average value of the output level of the inverter 49 increases and the addition output of the integrating adding circuit 56 increases in the negative direction. As for the crosstalk amount to the photo detector element 35, so long as the crosstalk amount from the track for the photo detector element 36 is larger than that from the track for the photo detector element 34, when the photo detector element 36 receives the reflection light from the land portion on the track and the photo detector element 34 receives the reflection light from the pit portion on the track, the photo detector element 35 is influenced by the crosstalk as compared with that in the case opposite to that mentioned above and the average value of the output level of the photo detector element 35 increases, so that the addition output of the integrating adding circuit 56 increases in the positive direction.

That is, the addition output of the integrating adding circuit 56 shows an unbalance of the crosstalk amount and the influence by the crosstalk depending on the inclination of the optical disc 26 can be known from such a value.

The detecting operation of the crosstalk amount of the crosstalk detecting circuit will now be described.

When the photo detector element 34 receives the reflection light from the land portion on the track and the photo detector element 36 receives the reflection light from the land portion on the track, each of the output levels of the photo detector elements 34 and 36 is larger than the second threshold value Th2. Each of the output levels of the comparators 43 and 44, therefore, becomes the high level and each of the output levels of the comparators 41 and 42 becomes the low level, so that the output level of the AND circuit 48 becomes the high level and each of the output levels of the other AND circuits 45 to 47 becomes the low level. In this instance, the S/H circuit 52 is activated in response to the high level output of the AND circuit 48, namely, the third gate signal and the S/H circuit 52 holds and generates the output signal of the photo detector element 35. The holding output is supplied to the integrating adding circuit 55.

When the photo detector element 34 receives the reflection light from the pit portion on the track and the photo detector element 36 also receives the reflection light from the pit portion on the track, each of the output levels of the photo detector elements 34 and 36 is smaller than the first threshold value Th1. Each of the output levels of the comparators 43 and 44, therefore, becomes the low level and each of the output levels of the comparators 41 and 42 becomes the high level, the output level of the AND circuit 45 becomes the high level and each of the output levels of the other AND circuits 46 to 48 becomes the low level. In this instance, the S/H circuit 51 is activated in response to the high level output of the AND circuit 45, namely, the fourth gate signal and the S/H circuit 51 holds and generates the inversion signal by the inverter 49 of the output signal of the photo detector element 35. The holding output is supplied to the integrating adding circuit 55.

The integrating adding circuit 55 integrates the signal which is supplied from each of the S/H circuits 51 and 52 and adds integration results and generates an addition result. Since the integrating and adding operations are continuously executed, the average values of the signal levels which are supplied from the S/H circuits 51 and 52 are added in the integrating adding circuit 55. Since the inverter 49 is provided, there is actually obtained a difference between the average value of the output signal of the photo detector element 35 which is derived when each of the output levels of the photo detector elements 34 and 36 is larger than the second threshold value Th2 and the average value of the output signal of the photo detector element 35 which is derived when each of the output levels of the photo detector elements 34 and 36 is smaller than the first threshold value Th1. When there is no crosstalk in the reception light of the photo detector element 35, since those average values are equal irrespective of the bright and dark states with regard to the adjacent tracks, the difference is almost equal to 0. When there is a crosstalk, however, it exerts an influence on the light reception of the photo detector element 35 depending on the brightness by the adjacent track. The addition output of the integrating adding circuit 55 indicates the crosstalk amount depending on the brightness.

When the eye patterns of the read signal which is derived from the photo detector element 35 are asymmetrical for the eye aperture different from the eye patterns shown in FIG. 5, the output signal of the inverter 49 can be corrected by multiplying a proper coefficient thereto.

Figure 6:
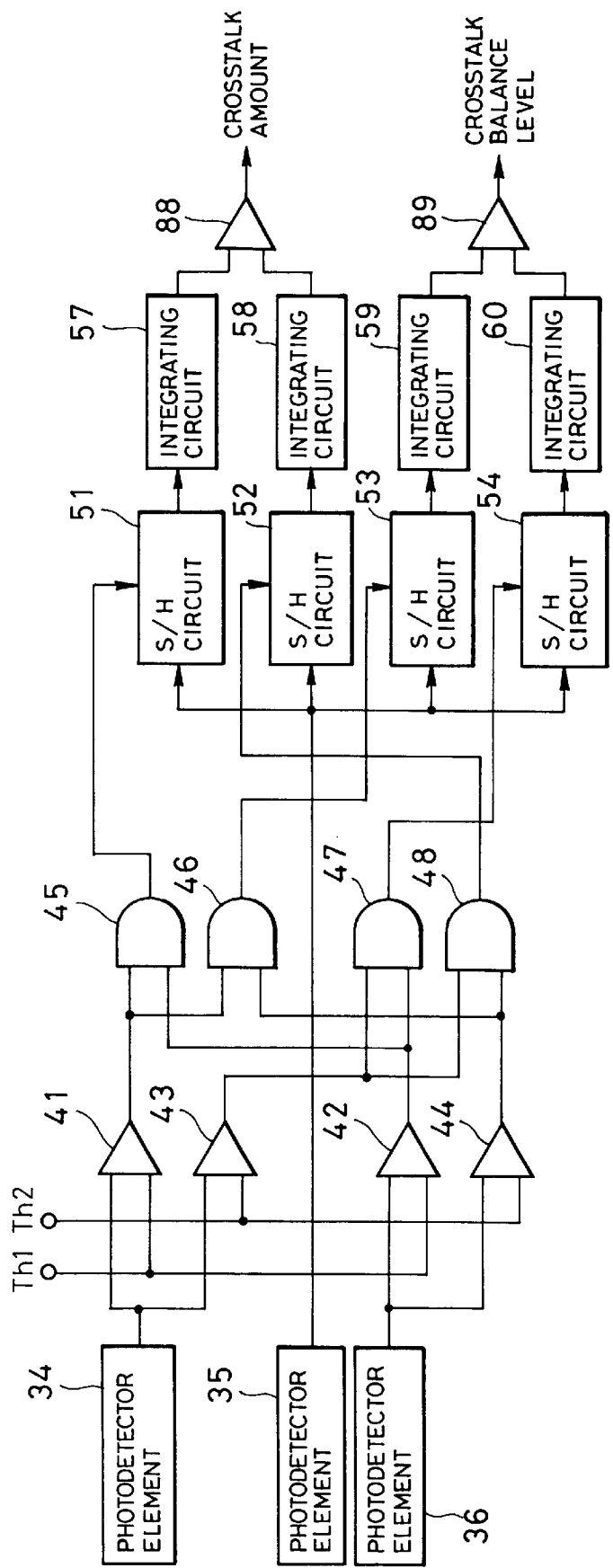
FIG. 6 is a diagram showing a crosstalk detecting circuit of the pickup apparatus according to the invention.

In the crosstalk detecting circuit shown in FIG. 4, after the output signal of the photo detector element 35 has been inverted by the inverter 49, it is supplied to the S/H circuits 51 and 54. In the integrating adding circuits 55 and 56, therefore, by adding both signals which are supplied, the subtraction is eventually performed. It will be understood, however, that in place of providing the inverter 49, as shown in FIG. 6, the output signal of the photo detector element 35 is supplied as it is to all of the S/H circuits 51 to 54 and the output signals of the S/H circuits 51 to 54 are supplied to integrating circuits 57 to 60 and are subtracted in differential amplifiers 88 and 89.

Figure 7:
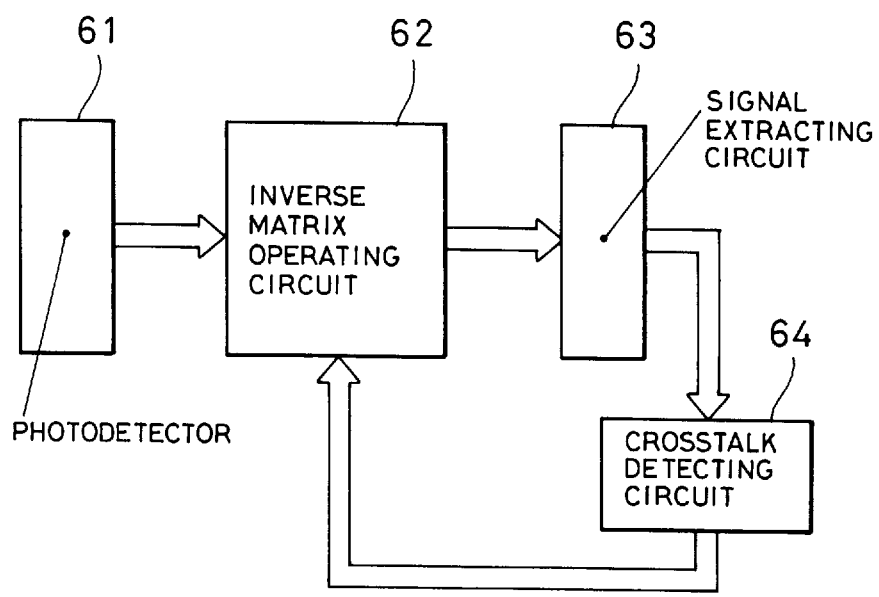
FIG. 7 is a block diagram showing a construction of a crosstalk removing portion of the pickup apparatus according to the invention.

FIG. 7 shows a pickup apparatus having a crosstalk removing function for removing a crosstalk in accordance with the crosstalk amount and crosstalk balance level which are obtained from the crosstalk detecting circuit mentioned above. In the pickup apparatus, a photodetector 61 has five photo detector elements. The photo detector elements are arranged in a line in the disc radial direction with predetermined intervals. On the recording surface of the optical disc, the light beam emitted from a light source (not shown) is irradiated to five or more tracks in the disc radial direction. The reflection light arrives at the five photo detector elements of the photodetector 61 and a track image is formed on each photo detector element every track among the continuous five tracks. An inverse matrix operating circuit 62 is connected to an output of the photodetector 61. The inverse matrix operating circuit 62 converts the output signal of the photodetector 61 by using the crosstalk amount and crosstalk balance level which are generated from the crosstalk detecting circuit 64. A signal extracting circuit 63 is connected to an output of the inverse matrix operating circuit 62. The signal extracting circuit 63 extracts three signals $p_2$, $p_3$, and $p_4$ among signals $p_1$ to $p_5$ as an operation result of the inverse matrix operating circuit 62 and supplies to a crosstalk detecting circuit 64. The crosstalk detecting circuit 64 has, for example, a construction shown in FIG. 4.

Now, assuming that signals which are generated from the photo detector elements of the photodetector 61 are denoted by $s_1$ to $s_5$ in accordance with a layout order of the photo detector elements and a crosstalk amount which is supplied from the crosstalk detecting circuit is denoted by "a" and a crosstalk balance level is denoted by "c", there is a matrix relation shown by the following equation (1) among the signals $p_1$ to $p_5$ as an operation result of the inverse matrix operating circuit 62. An influence by the crosstalks from the tracks other than the five tracks formed as track images in the photodetector 61 is ignored here.

$$\begin{pmatrix} s_1 \\ s_2 \\ s_3 \\ s_4 \\ s_5 \end{pmatrix} = \begin{pmatrix} 1 & a+c & 0 & 0 & 0 \\ a-c & 1 & a+c & 0 & 0 \\ 0 & a-c & 1 & a+c & 0 \\ 0 & 0 & a-c & 1 & a+c \\ 0 & 0 & 0 & a-c & 1 \end{pmatrix} \begin{pmatrix} p_1 \\ p_2 \\ p_3 \\ p_4 \\ p_5 \end{pmatrix} \quad (1)$$

Now, assuming that matrices of the output signals $s_1$ to $s_5$ of the photodetector 61, output signals "a" and "c" of the crosstalk detecting circuit 64, and output signals $p_1$ to $p_5$ of the inverse matrix operating circuit 62 are denoted as vectors S, C, and P, respectively, there is a relation $$S = C \cdot P$$

among them. In order to reconstruct the original signals recorded on the disc from the output signals $s_1$ to $s_5$ of the photodetector 61, it is sufficient to obtain an inverse matrix $C^{-1}$ of the matrix C and to calculate $$P = C^{-1} \cdot S$$

This calculation is actually equivalent to that a primary coupling of each of the output signals $s_1$ to $s_5$ of the photodetector 61 by coefficients which are obtained from "a" and "c".

Three signals $p_2$, $p_3$, and $p_4$ among the signals $p_1$ to $p_5$ as an inverse matrix operation result of the inverse matrix operating circuit 62 are extracted by the signal extracting circuit 63 and are applied to the crosstalk detecting circuit 64. The crosstalk amount "a" and crosstalk balance level "c" obtained by the crosstalk detecting circuit 64 are fed back to the inverse matrix operating circuit 62 and a crosstalk removing control is executed so as to reduce the crosstalk amount "a" and crosstalk balance level "c".

Figure 8:
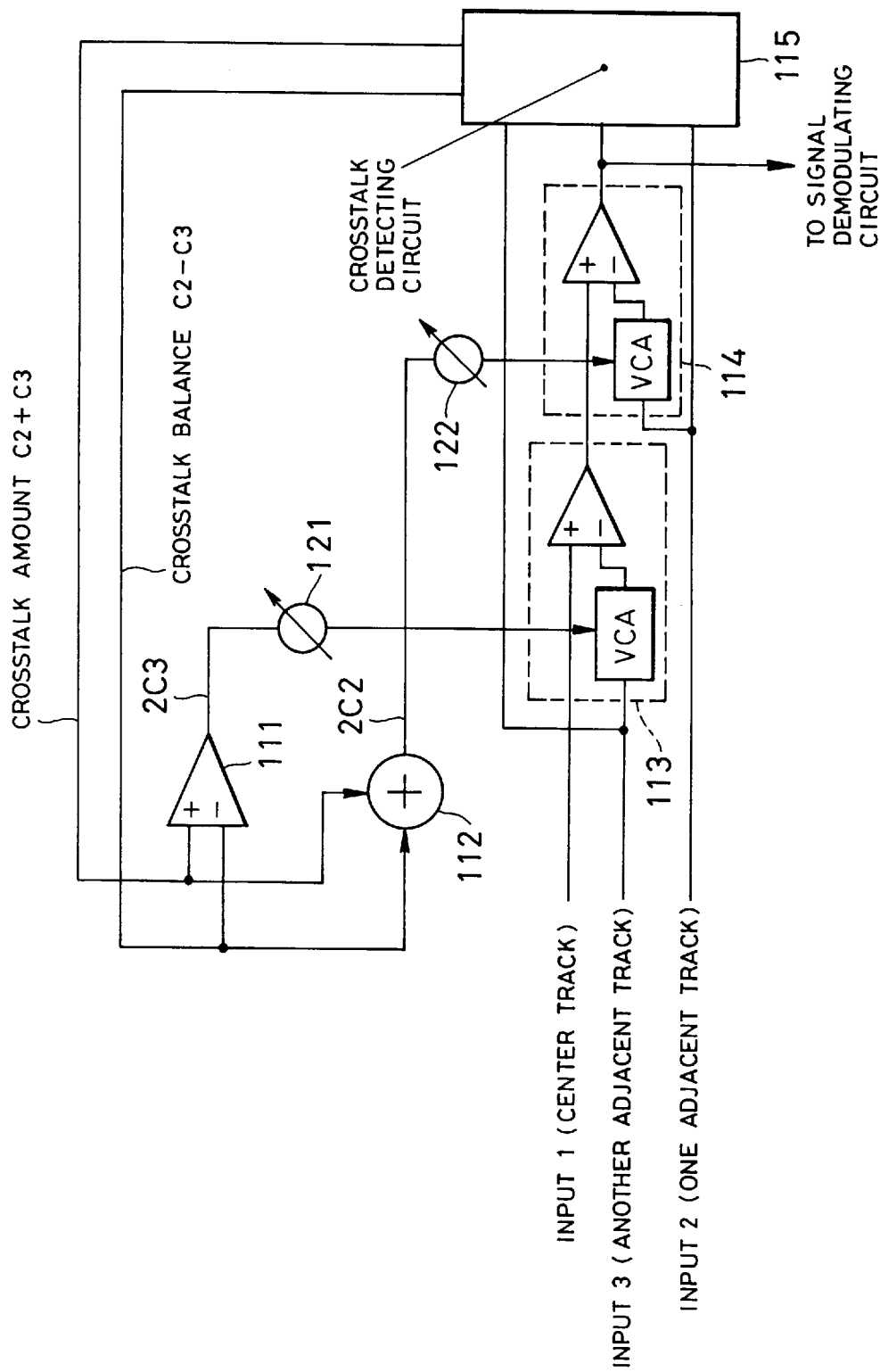
FIG. 8 is a block diagram showing a specific construction of an inverse matrix operating circuit.

According to an embodiment of performing the inverse matrix operation, it means that the adjacent track signals are subtracted from the signal of the center track in accordance with the crosstalk amount and a subtracting circuit for this purpose can be constructed by using a VCA (voltage controlled amplifier). An example of the construction is shown in FIG. 8. In FIG. 8, reference numeral 111 denotes a differential amplifier for obtaining a difference between the crosstalk amount and the crosstalk balance detected by the above construction. Reference numeral 112 denotes an adder for likewise obtaining a sum of them. Now, assuming that a sum (C2+C3) of a crosstalk amount C2 from an input 2 to which the read signal to one of the adjacent tracks is supplied and a crosstalk amount C3 from an input 3 to which the read signal for the other adjacent track is supplied is transmitted to one input of each of the differential amplifier 111 and adder 112 and a balance (C2–C3) of them is supplied to the other input of each of the differential amplifier 111 and adder 112, an addition signal of them indicates C2 and a difference of them indicates a magnitude of C3. The crosstalk is removed, therefore, by subtracting the signal of each of the adjacent tracks from the detection signal of the center track by voltage controlled amplifiers 113 and 114 at a proper ratio by gate adjusters 121 and 122. If a servo system such that the above signal is again examined by a crosstalk detecting circuit 115 is constructed, a signal such that the crosstalk amount and balance become 0 is derived by an output of the voltage controlled differential amplifier 114. By transmitting the signal to a demodulating circuit, even if the crosstalk amount changes, a signal in which it is removed can be always obtained.

It is also possible to arrange that only the signal $s_3$ in the output signal of the photodetector 61 is subjected to an operation in the inverse matrix operating circuit 62 to remove the crosstalk, and the crosstalk detecting circuit 64 is operated by using the signals $s_2$, $p_3$, and $s_4$ as input signals.

Figure 9:
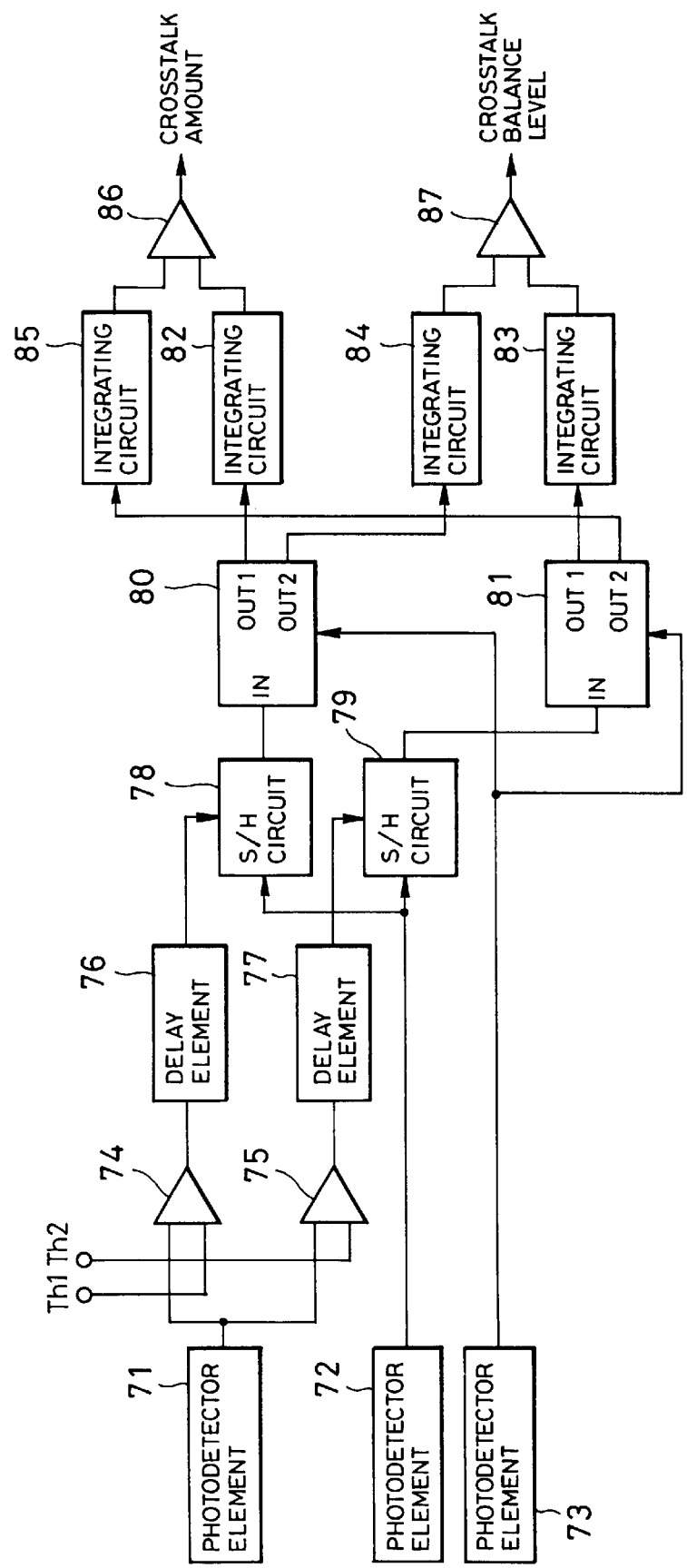
FIG. 9 is a diagram showing a crosstalk detecting circuit of a pickup apparatus using three beams according to the invention.
Figure 10:
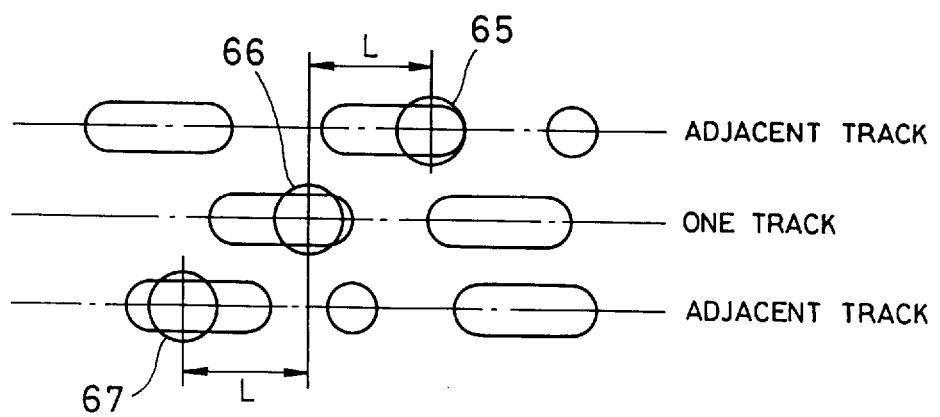
FIG. 10 is a diagram showing positional relations among three beam spot lights on a disc.

FIG. 9 shows a crosstalk detecting circuit of a pickup apparatus of a 3-beam system according to an embodiment of the invention. The crosstalk detecting circuit can be applied to the case of using an optical system of the 3-beam system as an optical system of the pickup apparatus and three photo detector elements 71 to 73 are provided for the optical system of the pickup apparatus. The photo detector elements 71 to 73 are arranged so as to receive the reflection light of the spot lights irradiated by three beams onto three adjacent tracks on the disk, respectively. As shown in FIG. 10, three spot lights 65 to 67 are formed on the disc. The spot light 66 is formed on one track locating at the center among three tracks. The spot light 65 is formed at a position that is preceding to the spot light 66 on one of the two adjacent tracks which are neighboring to one center track. The spot light 67 is formed at a position that is subsequent to the spot light 66 on the other one of the two adjacent tracks which are neighboring to the one center track. The photo detector element 71 receives the reflection light of the spot light 65. The photo detector element 72 receives the reflection light of the spot light 66. The photo detector element 73 receives the reflection light of the spot light 67.

In the crosstalk detecting circuit, two comparators 74 and 75 are connected to an output of the photo detector element 71. The comparator 74 compares an output level of the photo detector element 71 with the first threshold value Th1 and generates a high level output signal when the output level of the photo detector element 71 is smaller than Th1. The comparator 75 compares the output level of the photo detector element 71 with the second threshold value Th2 and generates a high level output signal when the output level of the photo detector element 71 is larger than Th2. Delay elements 76 and 77 are connected to the outputs of the comparators 74 and 75. The delay elements 76 and 77 correspond to times which are required for the spot lights 65 to 67 move by a distance L between the spot lights 65 and 66 or between the spot lights 66 and 67 in the tangential direction of the disc. A sampling and holding (S/H) circuit 78 is connected to an output of the delay element 76. A sampling and holding circuit 79 is connected to the delay element 77. The S/H circuit 78 holds an output level of the photo detector element 72 in accordance with an output signal of the delay element 76 and supplies the holding output to a selector 80. The S/H circuit 79 holds an output level of the photo detector element 72 in accordance with an output signal of the delay element 77 and supplies the holding output to a selector 81. Delayed output signals of the photo detector element 72 from the delay elements 76 and 77 are supplied to inputs IN of the selectors 80 and 81, respectively. An output signal of the photo detector element 73 is also supplied to the selectors 80 and 81. The selectors 80 and 81 have a comparing function for comparing an output level of the photo detector element 73 with the first threshold value Th1 and second threshold value Th2, respectively. Each of the selectors 80 and 81 further has first and second outputs OUT1 and OUT2. When the output level of the photo detector element 73 is smaller than the first threshold value Th1, the signal supplied to the input IN is generated from the first output OUT1. When the output level of the photo detector element 73 is larger than the second threshold value Th2, the signal supplied to the input IN is generated from the second output OUT2. Integrating circuits 82 and 83 are connected to the first outputs OUT1 of the selectors 80 and 81, respectively. Integrating circuits 84 and 85 are connected to the second output terminals OUT2 of the selectors 80 and 81, respectively. A differential amplifier 86 is connected to the integrating circuits 82 and 85 and a crosstalk amount is derived from the differential amplifier 86. A differential amplifier 87 is connected to the integrating circuits 83 and 84 and a crosstalk balance level is derived from the differential amplifier 87.

In the operation of the crosstalk detecting circuit, when the output level of the photo detector element 71 is smaller than the first threshold value Th1, the output level of the comparator 74 becomes the high level. This high level output signal is delayed by the delay element 76 and supplied to the S/H circuit 78. The S/H circuit 78 holds and generates the output signal of the photo detector element 72 in accordance with the high level signal. When the output level of the photo detector element 71 is larger than the second threshold value Th2, the output level of the comparator 75 becomes the high level. This high level output signal is delayed by the delay element 77 and supplied to the S/H circuit 79. The S/H circuit 79 holds and generates the output signal of the photo detector element 72 in accordance with the high level signal from the delay element 77. Since the apparatus is the pickup apparatus of the 3-beam system, the photo detector element 71 is preceding to the photo detector element 72 with respect to the position in the disc tangential direction by a time corresponding to the distance L. After the lapse of the time corresponding to the distance L after the output signals of the comparators 74 and 75 had been changed from the low level to the high level, the output signal of the photo detector element 72 is held in the S/H circuits 78 and 79, respectively.

When the output level of the photo detector element 73 is smaller than the first threshold value Th1, the selector 80 supplies the output signal of the S/H circuit 78 to the integrating circuit 82 and the selector 81 supplies the output signal of the S/H circuit 79 to the integrating circuit 83. When the output level of the photo detector element 73 is larger than the second threshold value Th2, the selector 80 supplies the output signal of the S/H circuit 78 to the integrating circuit 84 and the selector 81 supplies the output signal of the S/H circuit 79 to the integrating circuit 85.

The output signal of the photo detector element 72 which is derived when the output level of the photo detector element 71 is smaller than the first threshold value Th1 and the output level of the photo detector element 73 is smaller than the first threshold value Th1 is eventually integrated in the integrating circuit 82. The output signal of the photo detector element 72 which is derived when the output level of the photo detector element 71 is larger than the second threshold value Th2 and the output level of the photo detector element 73 is larger than the second threshold value Th2 is integrated in the integrating circuit 85. A difference between output levels of the integrating circuits 85 and 82 is obtained by the differential amplifier 86. An output signal of the differential amplifier 86 indicates the crosstalk amount.

The output signal of the photo detector element 72 which is derived when the output level of the photo detector element 71 is larger than the second threshold value Th2 and the output level of the photo detector element 73 is smaller than the first threshold value Th1 is integrated in the integrating circuit 83. The output signal of the photo detector element 72 which is derived when the output level of the photo detector element 71 is smaller than the first threshold value Th1 and the output level of the photo detector element 73 is larger than the second threshold value Th2 is integrated in the integrating circuit 84. A difference between output levels of the integrating circuits 84 and 83 is obtained by the differential amplifier 87. An output signal of the differential amplifier 87 indicates the crosstalk balance level.

That is, the crosstalk amount and crosstalk balance level derived from the differential amplifiers 86 and 87 are similar to those of the crosstalk detecting circuit shown in FIG. 4.

In the circuit of FIG. 9, the differential amplifier 86 is connected to the outputs of the integrating circuits 82 and 85 and the differential amplifier 87 is connected to the outputs of the integrating circuits 83 and 84. It is, however, also possible to directly connect the differential amplifiers 86 and 87 to the selectors 80 and 81 and to integrate their differential outputs by individual integrating circuits. It is also possible to provide the inverter as shown in FIG. 4 and to add the output values of the integrating circuits so as to supply the inversion signal to one of the integrating circuits.

When the delay elements are used as shown in the embodiment of FIG. 9, one circuit cannot fetch the next signal for a delay time, so that a sampling interval becomes long. Ordinarily, since the crosstalk characteristics are not suddenly changed so much, however, such a speed is an enough high speed. If it is necessary to cope with a steep crosstalk change, it is possible to raise a response speed by preparing the circuits of FIG. 9 of several systems and simultaneously using them.

The invention can be also applied to the pickup apparatus which reads the signal of only one track and is often used hitherto.

Figure 11:
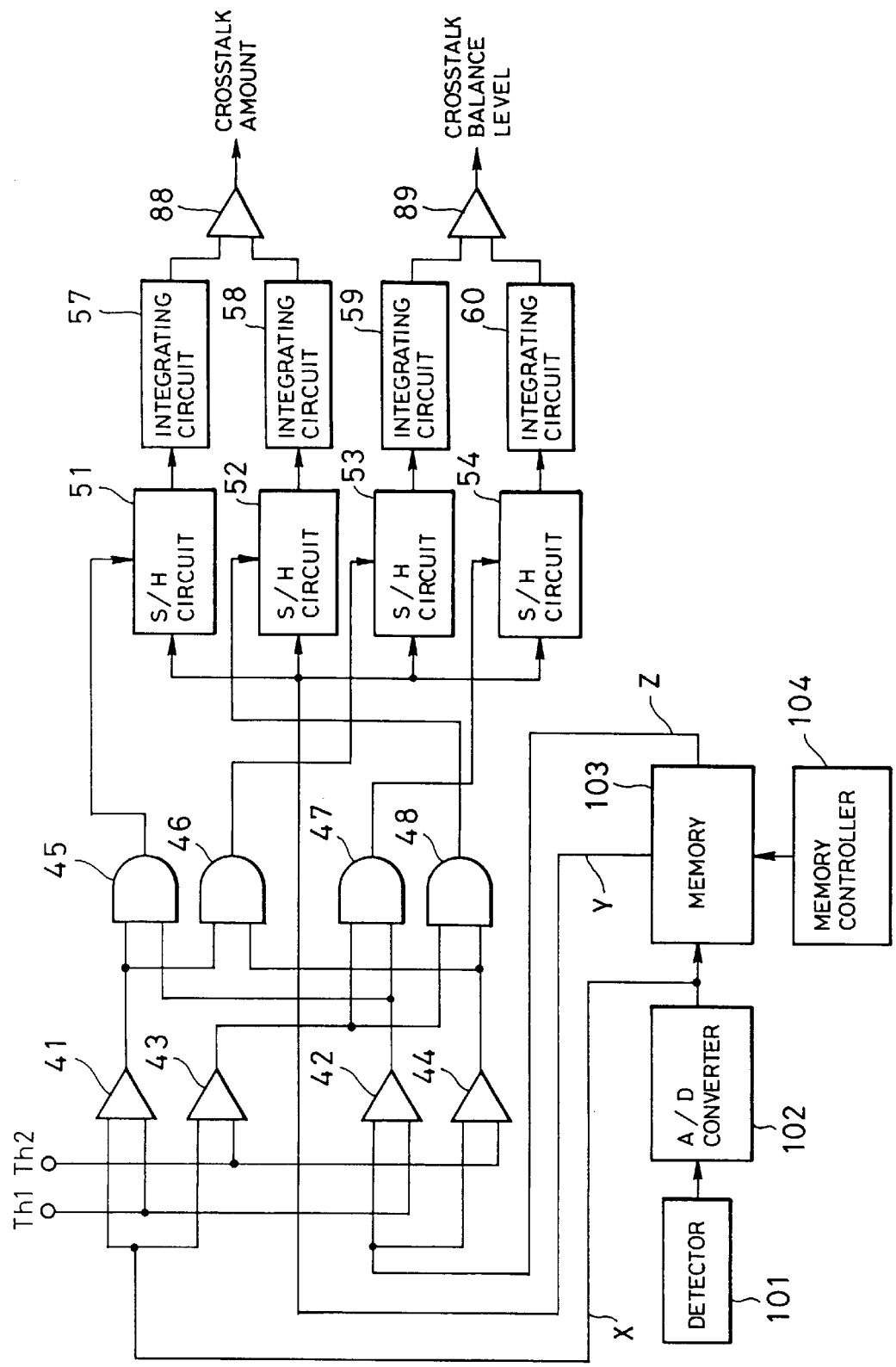
FIG. 11 is a diagram showing a crosstalk detecting circuit of a pickup apparatus using one beam according to the invention.

An embodiment in the case of constructing by once accumulating the signal detected by one light spot into a memory 103 is shown in FIG. 11. In FIG. 11, reference numeral 101 denotes a detector serving as a photo detector element for receiving a reflection light from a light spot portion to one track on the disc. A read signal as an output signal of the detector 101 is converted into a digital signal by an A/D converter 102 and stored into the memory 103. When one digital read signal value as one sampling value is supplied to the memory 103, a memory controller 104 generates the data collected at reading positions which are adjacent to the digital read signal value by distances of one track and two tracks. In FIG. 11, X denotes a first read signal value at the present reading position, Y a second read signal value at the reading position that is one track preceding to the present reading position in the disc radial direction, and Z a third read signal value at the reading position that is two tracks preceding to the present reading position in the disc radial direction. Storing locations of those data in the memory 103 can be calculated from a scanning speed of the medium and a sampling interval. Three signal values at the adjacent positions derived as mentioned above are compared with the threshold values Th1 and Th2 by the comparators 41 to 44, respectively, and the memory values at the intermediate time point are added in accordance with the conditions for getting the AND in a manner similar to the foregoing embodiment, thereby averaging. A process for dividing by the number of samples or the like can be also performed so as not to cause an overflow of the memory. A difference between the averaged signals is obtained by the differential amplifier 88 or 89 and is used as a signal to obtain the crosstalk amount or a balance thereof. It is also possible to construct in a manner such that after the differences were obtained, they are averaged. In the circuit of FIG. 11, the same portions as those in FIG. 6, namely, the comparators 41 to 44, AND circuits 45 to 48, S/H circuits 51 to 54, integrating circuits 57 to 60, and differential amplifiers 88 and 89 construct a circuit to process a digital signal.

Also a servo operation can be performed by subtracting the output value of the memory in accordance with the value of the crosstalk amount derived in the above example, whereby the crosstalk is reduced to 0.

Figure 12:
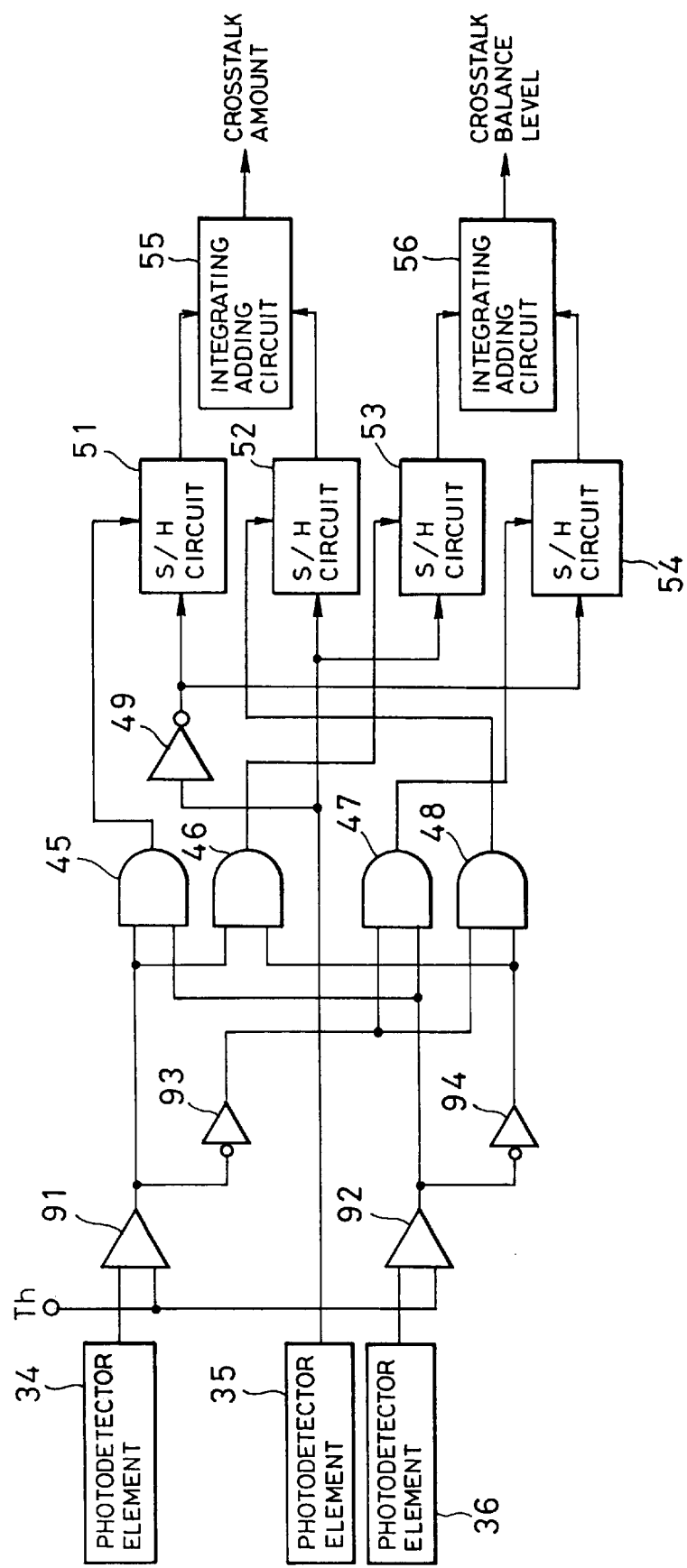
FIG. 12 is a diagram showing a modification of a crosstalk detecting circuit of a pickup apparatus according to the invention.

Although the case where the first threshold value Th1 is smaller than the second threshold value Th2 has been described in each of the above embodiments, the same value can be also used as first and second threshold values or the apparatus can be also made operative even if the second threshold value Th2 is smaller than the first threshold value Th1. For example, as shown in FIG. 12, when a same threshold value Th (near to 0 in the case of FIG. 5) is used for convenience, the processing circuit can be simplified although it is easily influenced by the noise. In the circuit of FIG. 12, inverters 93 and 94 for inverting output signals of comparators 91 and 92 are provided. This construction shall also similarly apply to the following embodiments.

Figure 13:
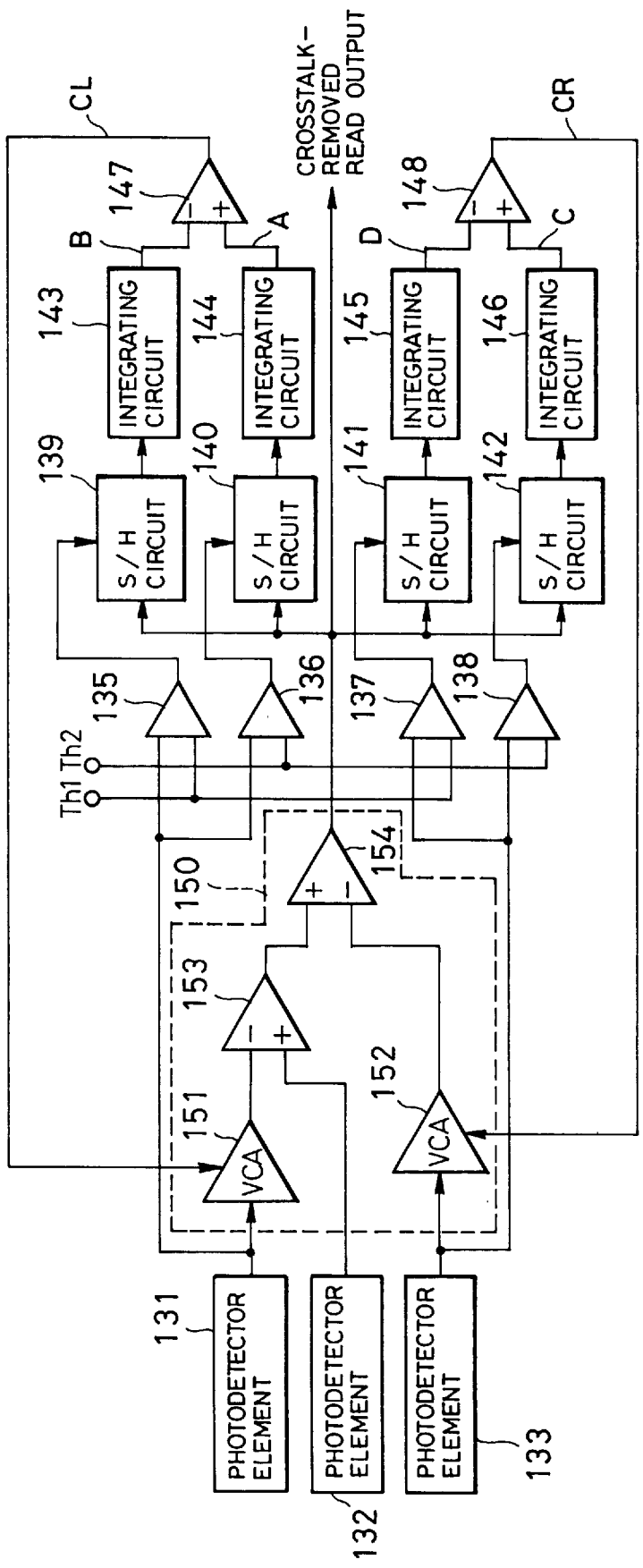
FIG. 13 is a diagram showing a crosstalk detecting circuit of a pickup apparatus of an image forming detecting system according to the invention.

FIG. 13 further shows a crosstalk detecting circuit of a pickup apparatus of an image forming detecting system according to an embodiment of the invention. In the crosstalk detecting circuit, each of photo detector elements 131 to 133 forms an image of one track among three neighboring tracks onto the photosensitive surface in a manner similar to the photo detector elements 34 to 36 of the photodetector 27 and forms a voltage value according to a light reception amount as a read signal value. The photo detector element 131 forms the read signal of the track at one end among the three tracks. The photo detector element 132 forms the read signal of the center track among the three tracks. The photo detector element 133 forms the read signal of the track at the other end among the three tracks. Comparators 135 and 136 are connected to the photo detector element 131. Comparators 137 and 138 are connected to the photo detector element 133. The comparator 135 compares an output level of the photo detector element 131 with the first threshold value Th1 and generates a high level output signal when the output level of the photo detector element 131 is smaller than Th1. The comparator 136 compares the output level of the photo detector element 131 with the second threshold value Th2 and generates an output signal at the high level when the output level of the photo detector element 131 is larger than Th2. The comparator 137 compares the output level of the photo detector element 133 with the first threshold value Th1 and generates an output signal at the high level when the output level of the photo detector element 133 is smaller than Th1. The comparators 138 compares the output level of the photo detector element 133 with the second threshold value Th2 and generates an output signal at the high level when the output level of the photo detector element 133 is larger than Th2.

Sampling and holding (S/H) circuits 139 to 142 are connected to outputs of the comparators 135 to 138. The S/H circuit 139 holds an output level of a crosstalk cancelling circuit 150, which will be explained hereinafter, in accordance with the high level signal. The S/H circuit 140 holds the output level of the crosstalk cancelling circuit 150 in accordance with the high level signal of the comparator 136. The S/H circuit 141 holds the output level of the crosstalk cancelling circuit 150 in accordance with the high level signal of the comparator 137. The S/H circuit 142 holds the output level of the crosstalk cancelling circuit 150 in accordance with the high level signal of the comparator 138. A differential amplifier 147 is connected to the S/H circuits 139 and 140 through integrating circuits 143 and 144. The differential amplifier 147 subtracts an output signal of the integrating circuit 143 from an output signal of the integrating circuit 144. A signal indicative of a crosstalk amount from the track at one end which is received as an image by the photo detector element 131 to the center track which is received as an image by the photo detector element 132 is generated from the differential amplifier 147. Similarly, a differential amplifier 148 is connected to the S/H circuits 141 and 142 through integrating circuits 145 and 146. The differential amplifier 148 subtracts an output signal of the integrating circuit 145 from an output signal of the integrating circuit 146. A signal indicative of a crosstalk amount from the track at the other end which is received as an image by the photo detector element 133 to the center track is generated from the differential amplifier 148.

The crosstalk cancelling circuit 150 is a circuit to remove a crosstalk component included in the read signal for the center track which is generated from the photo detector element 132 and should be actually read. The crosstalk cancelling circuit 150 is made up of VCA (voltage controlled amplifiers) 151 and 152 and differential amplifiers 153 and 154. The VCA 151 amplifies the output signal of the photo detector element 131 by a gain according to the output signal of the differential amplifier 147. The VCA 152 amplifies the output signal of the photo detector element 133 by a gain according to the output signal of the differential amplifier 148. The differential amplifier 153 subtracts an output signal of the VCA 151 from the output signal of the photo detector element 132. The differential amplifier 154 subtracts an output signal of the VCA 152 from an output signal of the differential amplifier 153. An output signal of the differential amplifier 154 is a signal in which the crosstalk component included in the read signal for the center track is removed, and it is supplied to the S/H circuits 139 to 142.

In the crosstalk detecting circuit with the above construction, each of the read signals of both tracks adjacent to the center track is discriminated into three values by the two threshold values Th1 and Th2 by the comparators 135 to 138. The S/H circuit 139 holds the read signal value for the center track from the photo detector element 132 which is derived when the read signal value for the track at one end from the photo detector element 131 is smaller than Th1 (accurately speaking, the read signal value in which the crosstalk component is removed by the crosstalk cancelling circuit 150: the same shall also similarly apply to the other S/H circuits 140 to 142 hereinafter). The holding read signal value is integrated by the integrating circuit 143. The S/H circuit 140 holds the read signal value for the center track from the photo detector element 132 which is derived when the read signal value for the track at one end from the photo detector element 131 is larger than Th2. The holding read signal value is integrated by the integrating circuit 144. The S/H circuit 141 holds the read signal value for the center track from the photo detector element 132 which is derived when the read signal value for the track at the other end from the photo detector element 133 is smaller than Th1. The holding read signal value is integrated by the integrating circuit 145. The S/H circuit 142 holds the read signal value for the center track from the photo detector element 132 which is derived when the read signal value for the track at the other end from the photo detector element 133 is larger than Th2. The holding read signal value is integrated by the integrating circuit 146.

Now, assuming that the value smaller than Th1 among the above three values is denoted as L and the value larger than Th2 is denoted as H, an output signal A of the integrating circuit 144 indicates an integration value of the read signal value of the center track when the read signal value of the track at one end is equal to H. An output signal B of the integrating circuit 143 indicates an integration value of the read signal value of the center track when the read signal value of the track at one end is equal to L. The differential amplifier 147 successively forms a difference (A−B) as a signal CL indicative of the crosstalk amount. Similarly, an output signal C of the integrating circuit 146 indicates an integration value of the read signal value of the center track when the read signal value of the track at the other end is equal to H. An output signal D of the integrating circuit 145 indicates an integration value of the read signal value of the center track when the read signal value of the track at the other end is equal to L. The differential amplifier 148 successively forms a difference (C−D) as a signal CR indicative of the crosstalk amount.

The signal A indicates the average value of the read signal of the center track when the track at one end as an adjacent track is bright. The signal B shows the average value of the read signal of the center track when the track at one end is dark. When there is no crosstalk from the adjacent tracks to the center track, both of the signals A and B indicate the average level of the read signal of only the center track irrespective of the signals of the adjacent tracks and become the same value. When the crosstalk exists, however, the signal A increases due to the influence by the adjacent track (track at one end) and the signal B decreases due to the influence by the track at one end. The difference signal CL, therefore, indicates the value corresponding to the crosstalk amount from the track at one end.

The signal C indicates the average value of the read signal of the center track when the track at the other end serving as an adjacent track is bright. The signal D shows the average value of the read signal of the center track when the track at the other end is dark. When there is no crosstalk from the adjacent tracks to the center track, both of the signals C and D show the average level of the read signal of only the center track irrespective of the signals of the adjacent tracks and become the same value. When the crosstalk exists, however, the signal C increases due to the influence by the adjacent track (track at the other end) and the signal D decreases due to the influence by the track at the other end. The difference signal CR, therefore, indicates the value corresponding to the crosstalk amount from the track at the other end.

If the crosstalks are detected from the read signal of the center track and the tilt of the disc is controlled by the difference between the crosstalk signals, it is possible to control so as to balance the crosstalks while including the aberration of the lens or the like, so that the signal better than that of the tilt sensor can be obtained. By using the liquid crystal pickup in combination with the crosstalk detecting circuit, a wavefront control can be performed so as to minimize the crosstalks.

A servo can be applied so as to set the crosstalks to 0 by multiplying the read signals of the adjacent tracks by coefficients, subtracting multiplication results from the read signal of the center track, detecting the crosstalk for subtraction results, and controlling the coefficients.

For example, as shown in FIG. 13, a gain of the VCA 151 is controlled in accordance with the signal CL and the level of the read signal from the photo detector element 131 is amplified by the gain of the VCA 151. That is, in the VCA 151, the coefficient according to the signal CL is multiplied to the read signal from the photo detector element 131. An output value of the VCA 151 corresponds to the crosstalk component from the track at one end in the read signal of the center track. A gain of the VCA 152 is controlled in accordance with the signal CR and the level of the read signal from the photo detector element 133 is amplified by the gain of the VCA 152. That is, in the VCA 152, the coefficient according to the signal CR is multiplied to the read signal from the photo detector element 133. An output value of the VCA 152 corresponds to the crosstalk component from the track at the other end in the read signal of the center track. In the differential amplifier 153, the crosstalk component from the track at one end is reduced by subtracting the output signal of the VCA 151 from the read signal from the photo detector element 132. Further, the crosstalk component from the track at the other end is also reduced by subtracting the output signal of the VCA 152 from the output signal of the differential amplifier 153 by the differential amplifier 154. The output signal of the differential amplifier 154, therefore, corresponds to the read signal of the center track in which the crosstalk components from both the adjacent tracks are decreased. The read signal is supplied to the S/H circuits 139 to 142 and a feedback system in which the signals CL and CR are generated is formed, so that the read signal of the center track is controlled so as to set the crosstalk component to 0.

There are two objects to construct so as to have two threshold values Th1 and Th2. One of the objects is to raise a detecting sensitivity. When a modulation degree of the adjacent track is small, an influence by the crosstalk is also small and if averaging while including all of the influences, it causes a deterioration in sensitivity. The sensitivity, therefore, can be improved by performing an addition and integration to only the signals of amplitudes of a certain value or more. The other object is to enlarge an allowance of a gate time. The amplitudes in the case of short pit/land ratios such as 3T, 4T, or the like are smaller than that of the MTF (modulation transfer function) characteristics and the threshold values are set to values which are not exceeded by the amplitudes of such lengths. Since the pit/land ratio is limited to the pit/land which makes the gate operative, particularly, in the case of performing a gating operation by delaying the signal, there is an effect such that an allowance amount of a deviation of the delay time is enlarged.

Figure 14:
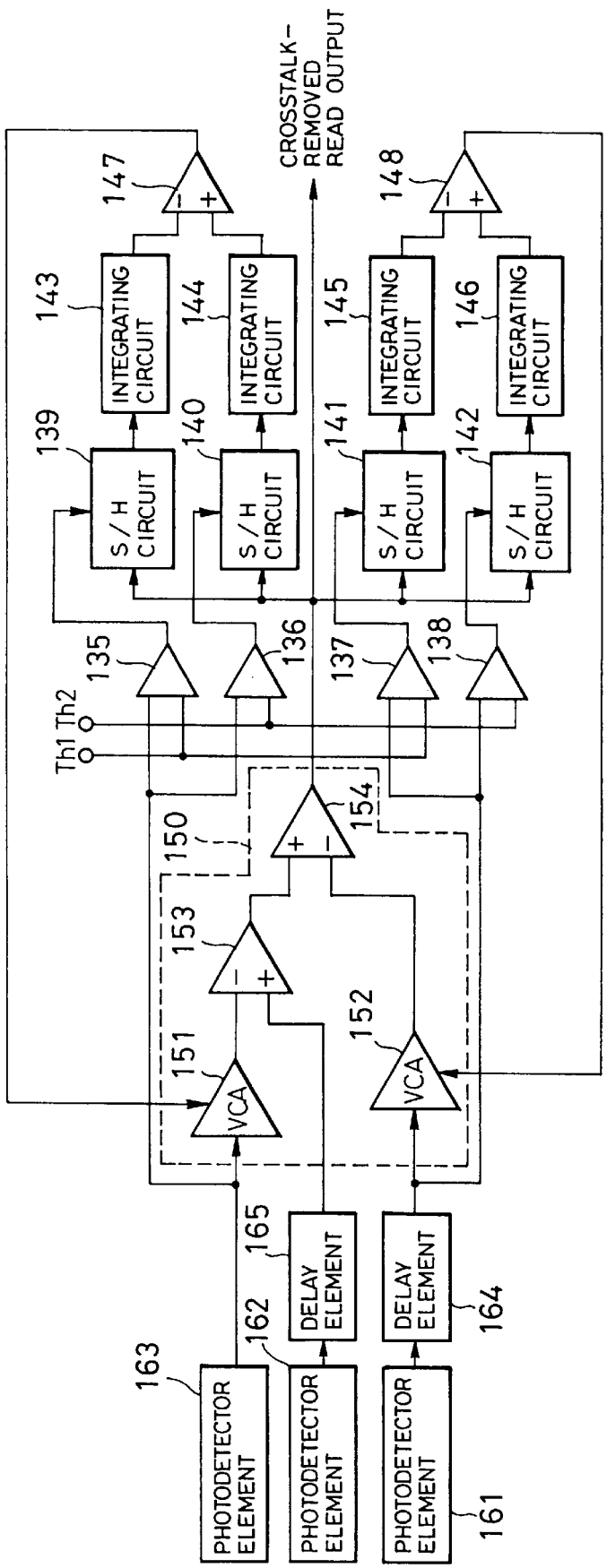
FIG. 14 is a diagram showing a crosstalk detecting circuit of a pickup apparatus using three beams according to the invention.

FIG. 14 shows an embodiment in the case of applying the crosstalk detecting circuit of FIG. 13 to a pickup apparatus of the 3-beam system. In the embodiment, three photo detector elements 161 to 163 are provided for an optical system of the pickup apparatus. As shown in FIG. 10, three spot lights are formed on the disc. The photo detector element 162 receives the reflection light of the spot light formed on the track to be read on the disc, namely, the center track. The photo detector element 161 receives the reflection light of the preceding spot light on one of the adjacent tracks. The photo detector element 163 receives the reflection light of the delayed spot light on the other adjacent track. A read signal from the photo detector element 163 is directly supplied to the comparators 135 and 136 and crosstalk cancelling circuit 150. A read signal from the photo detector element 161, however, is supplied to the comparators 137 and 138 and crosstalk cancelling circuit 150 through a delay element 164. A read signal from the photo detector element 162 is supplied to the crosstalk cancelling circuit 150 through a delay element 165. The delay element 164 has a delay time corresponding to a time that is twice as long as the distance L shown in FIG. 10. The delay element 165 has a delay time corresponding to the distance L. The other construction of the crosstalk detecting circuit is similar to that of FIG. 13 and the operation similar to that mentioned above is executed.

Figure 15:
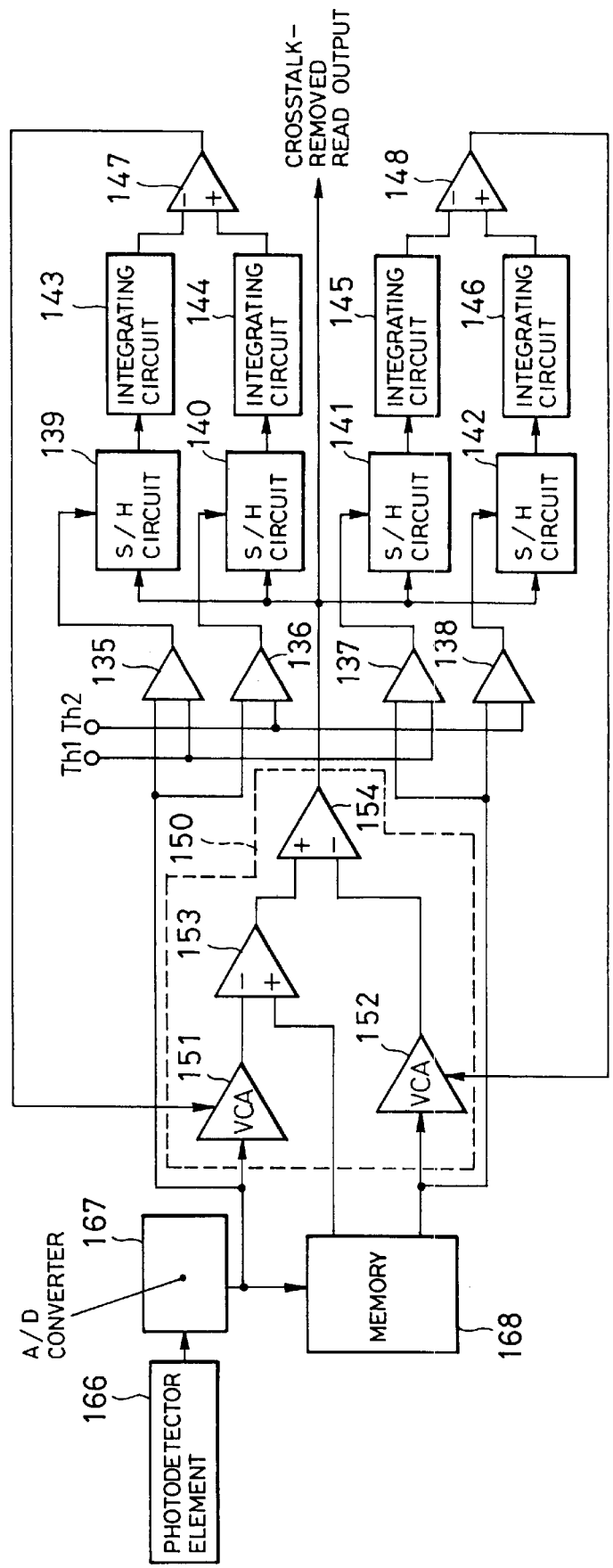
FIG. 15 is a diagram showing a crosstalk detecting circuit of a pickup apparatus using one beam according to the invention.

FIG. 15 shows an embodiment in the case of applying the crosstalk detecting circuit of FIG. 13 to a pickup apparatus of the 1-beam system. In the embodiment, one photo detector element 166 is provided for an optical system of the pickup apparatus. A read signal as an output signal of the photo detector element 166 is converted into a digital signal by an A/D converter 167 and is stored into a memory 168 after that. When one digital read signal value as one sampling value is sent to the memory 168, a memory controller (not shown) generates the data collected at the reading positions which are adjacent to the digital read signal value by one track and two tracks. A first read signal value at the present reading position is supplied to the comparators 135 and 136 and crosstalk cancelling circuit 150. A second read signal value at the reading position that is one track preceding to the present reading position stored in the memory 168 before in the disc radial direction is read out from the memory 168 and supplied to the crosstalk cancelling circuit 150. A third read signal value at the reading position that is two tracks preceding to the present reading position stored further before in the memory 168 in the disc radial direction is supplied to the comparators 137 and 138 and crosstalk cancelling circuit 150. The storing positions of the data in the memory 168 can be calculated from the scanning speed of the medium and the sampling interval. The other construction of the crosstalk detecting circuit is similar to that in FIG. 13. The operation similar to that mentioned above is executed. In the case of FIG. 15, the crosstalk detecting circuit is a circuit to process a digital signal.

Figure 16:
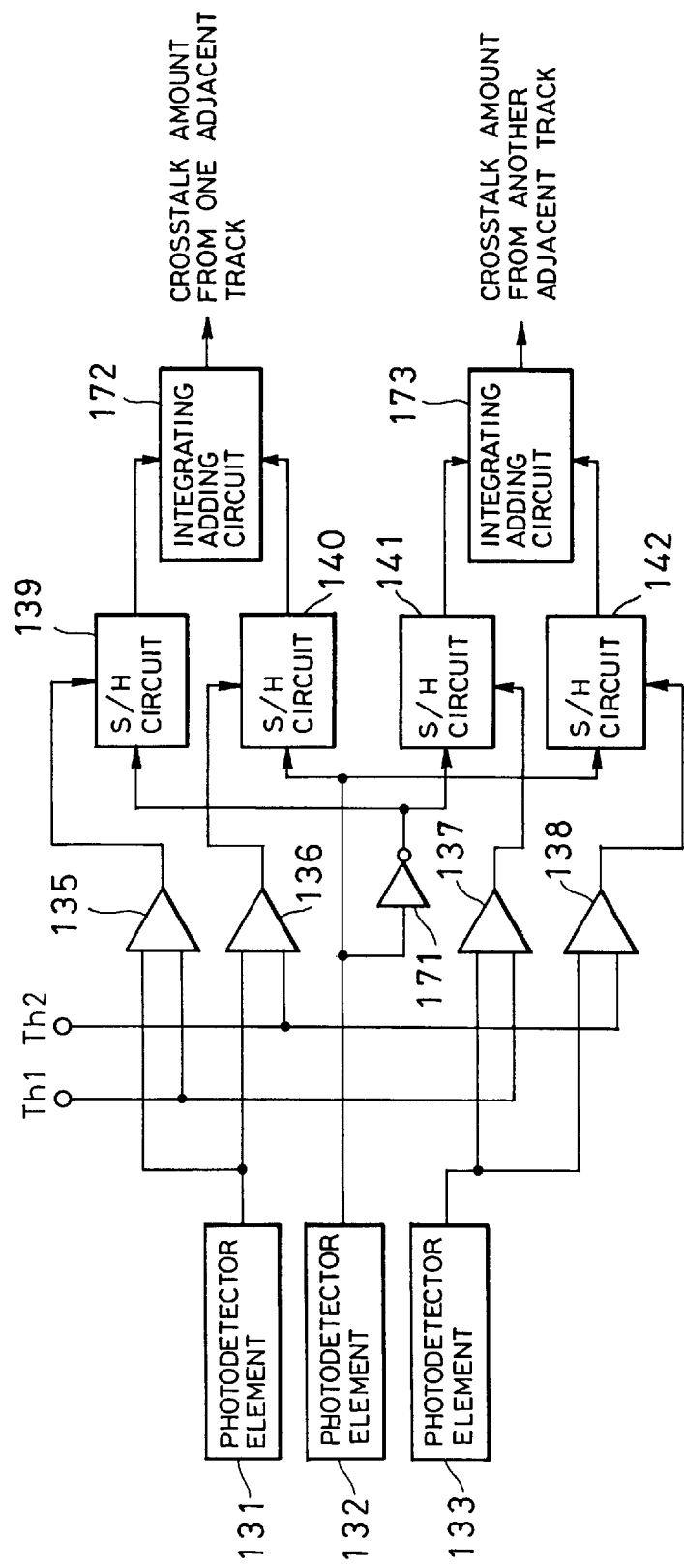
FIG. 16 is a diagram showing a modification of the crosstalk detecting circuit of FIG. 13.

FIG. 16 is a construction such that in the crosstalk detecting circuit in FIG. 13, a read signal for the center track is supplied to the S/H circuits 139 and 141 through an inverter 171. After the output signals of the S/H circuits 139 and 140 were individually integrated by an integrating adding circuit 172, they are added. After the output signals of the S/H circuits 141 and 142 were individually integrated by an integrating adding circuit 173, they are added. Signals indicative of the crosstalk amounts from the adjacent tracks are generated from the integrating adding circuits 172 and 173. It is also possible to construct in a rule such that the output signals of the integrating adding circuits 172 and 173 are supplied to the crosstalk cancelling circuit as shown in FIG. 13 and the read signal of the center track which is the output signal of the crosstalk cancelling circuit and in which the crosstalk component is reduced is supplied to the S/H circuits 140 and 142 and inverter 171. The construction of FIG. 16 can be also applied to the pickup apparatus of the 3-beam system and the pickup apparatus of the 1-beam system.

Figure 17:
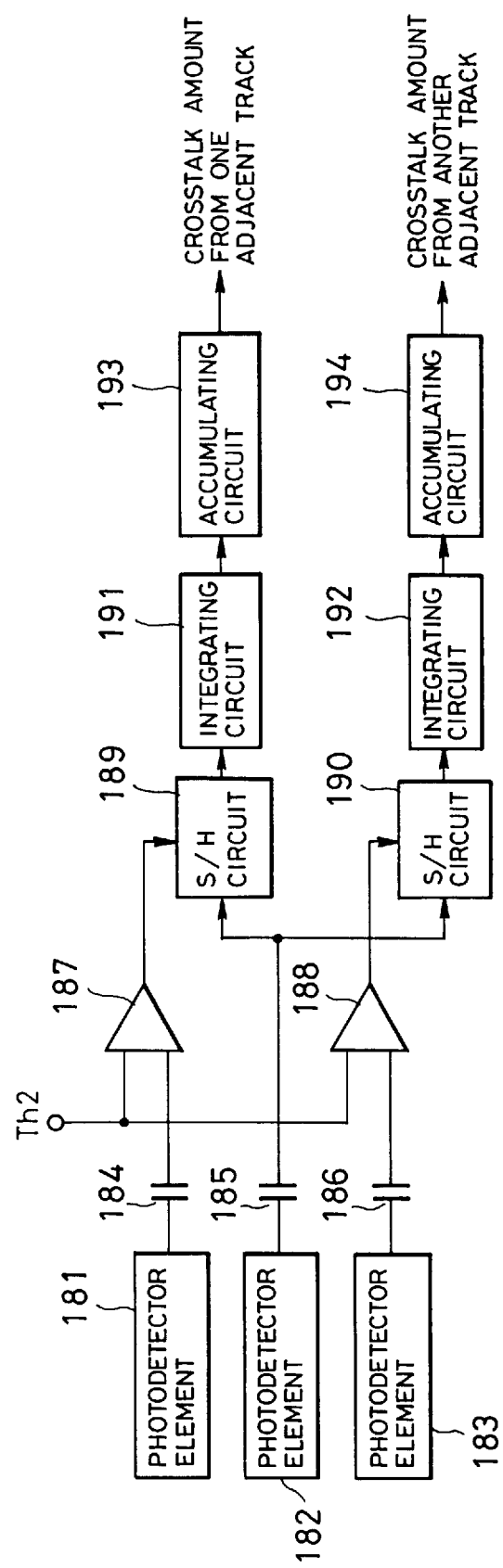
FIG. 17 is a diagram showing a crosstalk detecting circuit of a pickup apparatus of an image forming detecting system according to the invention.

FIG. 17 further shows a crosstalk detecting circuit of a pickup apparatus of an image forming detecting system according to an embodiment of the invention. Photo detector elements 181 to 183 are similar to the photo detector elements 131 to 133 in FIG. 13. Capacitors 184 to 186 are connected to outputs of the photo detector elements 181 to 183. The capacitors 184 to 186 are used to extract AC components in read signals as output signals of the photo detector elements 181 to 183. The AC component transmitted through the capacitor 184 is compared with the threshold value Th2 by a comparator 187. The AC component transmitted through the capacitor 186 is compared with the threshold value Th2. When the AC component transmitted through the capacitor 184 is larger than the threshold value Th2, a sampling and holding circuit 189 holds the AC component transmitted through the capacitor 185. The AC component held is integrated by an integrating circuit 191 and is accumulated by an accumulating circuit 193. That is, since a DC component of the read signal is cut out by the capacitor 185, the average value of the read signal of the center track is equal to 0. A signal derived from the accumulating circuit 193 indicates the crosstalk amount from one adjacent track to the center track. Similarly, when the AC component transmitted through the capacitor 186 is larger than the threshold value Th2, a sampling and holding circuit 190 holds the AC component transmitted through the capacitor 185. The AC component held is integrated by an integrating circuit 192 and is accumulated in an accumulating circuit 194. A signal derived from the accumulating circuit 194 indicates the crosstalk amount from the other adjacent track to the center track.

In the embodiment, although the capacitors 184 to 186 are used to extract the AC components in the output signals of the photo detector elements 181 to 183, the invention is not limited to them. For example, a high pass filter including an operational amplifier can be also used.

Figure 18:
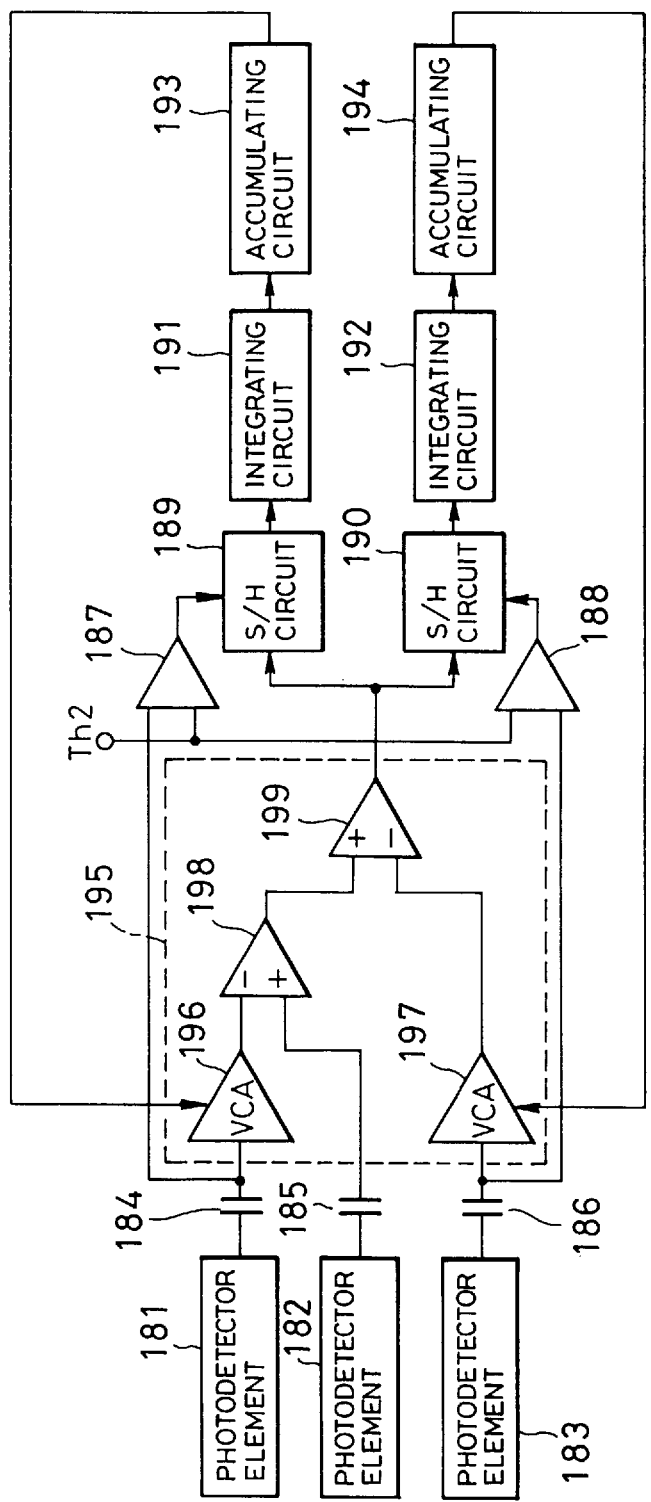
FIG. 18 is a diagram showing a construction in which a crosstalk cancelling circuit is provided for the crosstalk detecting circuit in FIG. 17.

FIG. 18 shows an example in which a crosstalk cancelling circuit 195 to remove a crosstalk component included in the read signal for the center track in accordance with a signal indicative of the crosstalk amount obtained in the construction of FIG. 17 is provided. The crosstalk cancelling circuit 195 has VCAs 196 and 197 and differential amplifiers 198 and 199 in a manner similar to the crosstalk cancelling circuit 150 shown in FIG. 13.

Figure 19:
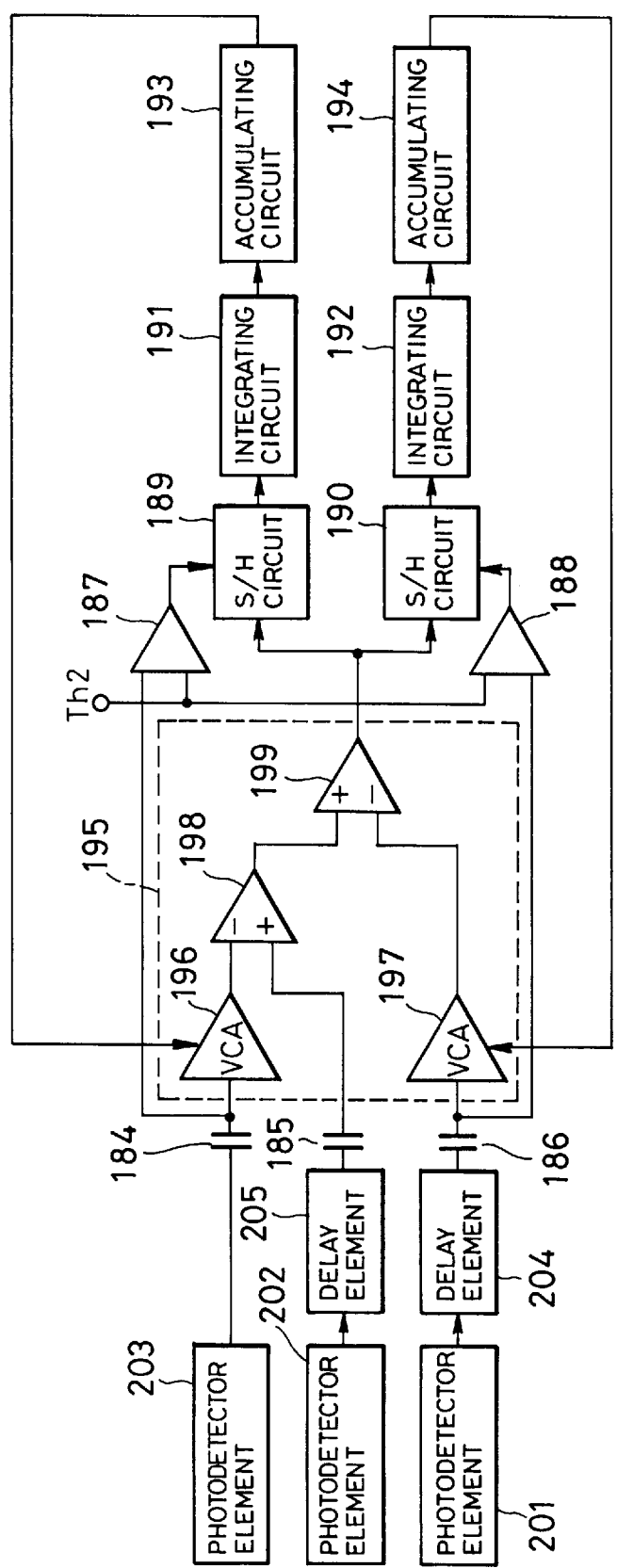
FIG. 19 is a diagram showing a crosstalk detecting circuit of a pickup apparatus using three beams according to the invention.

FIG. 19 shows an embodiment in the case of applying the crosstalk detecting circuit in FIG. 18 to the pickup apparatus of the 3-beam system. In the embodiment, three photo detector elements 201 to 203 are provided for an optical system of the pickup apparatus. The photo detector elements 201 to 203 are similar to the photo detector elements 161 to 163 shown in FIG. 14. Although a read signal from the photo detector element 203 is directly supplied to the capacitor 184, a read signal from the photo detector element 201 is supplied to the capacitor 186 through a delay element 204. A read signal from the photo detector element 202 is also supplied to the capacitor 185 through a delay element 205. The delay element 204 has a delay time corresponding to a time that is twice as long as the distance L shown in FIG. 10. The delay element 205 has a delay time corresponding to a time as long as the distance L. The other construction of the crosstalk detecting circuit is similar to that of FIG. 17 or 18. The operation similar to that mentioned above is executed.

FIG. 20 shows an embodiment in the case of applying the crosstalk detecting circuit of FIG. 18 to the pickup apparatus of the 1-beam system. In the embodiment, one photo detector element 206 is provided for an optical system of the pickup apparatus. After a read signal as an output signal of the photo detector element 206 has been converted into a digital signal by an A/D converter 207, it is stored into a memory 208. When one digital read signal value as one sampling value is sent to the memory 208, a memory controller (not shown) generates the data collected at reading positions which are adjacent to the digital read signal value by one track and two tracks. A first read signal value at the present reading position is supplied to the capacitor 184. A second read signal value at the reading position that is one track preceding to the present reading position stored in the memory 208 before in the disc radial direction is read out from the memory 208 and supplied to the capacitor 185. A third read signal value at the reading position that is two tracks preceding to the present reading position stored in the memory 208 further before in the disc radial direction Is supplied to the capacitor 186. The storing positions of the data in the memory 208 can be calculated from the scanning speed of the medium and the sampling interval. The other construction of the crosstalk detecting circuit is similar to that in FIG. 17 or 18. The operation similar to that mentioned above is executed. In the case of FIG. 20, the crosstalk detecting circuit is a circuit to process the digital signal.

In each of the foregoing embodiments of FIGS. 17 to 20, although Th2 is used as a threshold value of the comparators 187 and 188, it is also possible to construct in a manner such that when the input signal from the capacitor is smaller than the threshold value Th1, the comparators 187 and 188 generate gate signals and allows the S/H circuits 189 and 190 to perform the holding operation, respectively.

In the foregoing description the explanation has been made by way of the system such that the read signal of the center track is almost processed in analog form in each of the foregoing embodiments. However, in any of the embodiments, it is also possible to process so as to convert the read signal into a digital value and to satisfy a similar function. Moreover, circuits such as a foregoing crosstalk detecting circuit and the like in the pickup apparatus can also be further formed together with a processing circuit having another function such as a signal demodulation or the like.

Although only the read signal of the center track is generated in each of the forgoing embodiments, since the crosstalks can be also similarly removed from the signals of the adjacent tracks, a plurality of track signals can be also simultaneously read out.

The invention can be also obviously used together with the other crosstalk and tilt detecting apparatus which has been well known hitherto. It is also possible to construct such that the conventional driving mechanism is adjusted by the tilt detection signal (crosstalk balance) derived by the invention, thereby setting off the tilt. A thickness of plate of the disc can be also examined by a discrimination result of the crosstalk amount and an influence by the error of the plate thickness can be also corrected.

The value of the thresholds in each of the embodiments can be properly varied depending on the kind of disc, a manufacturing method thereof, a wavelength of a light source which is used, a numerical aperture, or the like. Various constructions such that the threshold values are varied depending on a shape such as asymmetry of the signal or the like, they are examined from a reproduction waveform of a specific pattern, they are varied depending on an error rate upon demodulation of the signal, and the like.

Although the embodiments have been described with respect to the example in which the optical disc is used as a recording medium, the shape of the recording medium is not limited to the disc but a card shape can be also used.

According to the invention as described above, the crosstalk amounts to the read signal from the adjacent tracks and their balance level for one track can be known from the read signals for one track and its adjacent tracks derived by the optical pickup apparatus by using the relatively simple circuit. The apparatus can be made, further, operative so as to remove the crosstalks. The signal can be preferably reproduced, therefore, in the case of reproducing the inclined disc. Since there is no need to insert a special crosstalk detecting pattern onto the disc, further, there are very large effects such that a high density recording can be realized without sacrificing the signal capacity and the like.

The preferred embodiments of the present invention have been made. It will be obviously understood that those skilled in the art can presume many modifications and variations. All of the modifications and variations are incorporated in the scope of claims of the invention.

What is claimed is:

1. An optical pickup apparatus for optically reading signals recorded on tracks of a recording medium, comprising:

signal reading means for simultaneously, individually, and optically reading the recording signals of at least three adjacent tracks on said recording medium in parallel and forming read signal values for the tracks at one end, center, and the other end of three tracks as first, second, and third read signal values, respectively;

comparing means for individually comparing said first and third read signal values with a first threshold value and a second threshold value that is larger than said first threshold value;

means for generating a first gate signal at a time point when said first read signal value is smaller than said first threshold value and said third read signal value is larger than said second threshold value;

means for generating a second gate signal at a time point when said first read signal value is larger than said second threshold value and said third read signal value is smaller than said first threshold value; and crosstalk balance detecting means for forming a difference between said second read signal value when said first gate signal is generated and said second read signal value when said second gate signal is generated as a value indicative of a balance level of the crosstalk to said second read signal.

2. An apparatus according to claim 1, wherein said signal reading means corrects a crosstalk balance of each of the read signals in accordance with the output value of said crosstalk balance detecting means and generates a corrected crosstalk balance.

3. An apparatus according to claim 1, wherein said crosstalk balance detecting means comprises:

a first sampling and holding circuit for holding and generating said second read signal value in accordance with said first gate signal;

an inverter for inverting said second read signal;

a second sampling and holding circuit for holding and generating an output signal value of said inverter in accordance with said second gate signal; and an integrating adding circuit for adding a value obtained by integrating an output signal of said first sampling and holding circuit and a value obtained by integrating an output signal of said second sampling and holding circuit, thereby obtaining a value indicative of a balance of said crosstalks.

4. An apparatus according to claim 1, wherein said crosstalk balance detecting means comprises:

a first sampling and holding circuit for holding and generating said second read signal value in accordance with said first gate signal;

an inverter for inverting said second read signal;

a second sampling and holding circuit for holding and generating an output signal value of said inverter in accordance with said second gate signal; and an adding integrating circuit for adding an output signal of said first sampling and holding circuit and an output signal of said second sampling and holding circuit and integrating a value derived by said addition, thereby obtaining a value indicative of a balance of said crosstalks.

5. An apparatus according to claim 1, wherein said crosstalk balance detecting means comprises:

a first sampling and holding circuit for holding and generating said second read signal value in accordance with said first gate signal;

a second sampling and holding circuit for holding and generating said second read signal value in accordance with said second gate signal; and an integrating subtracting circuit for setting a difference between a value obtained by integrating an output signal of said first sampling and holding circuit and a value obtained by integrating an output signal of said second sampling and holding circuit into a value indicative of a balance of said crosstalks.

6. An apparatus according to claim 1, wherein said crosstalk balance detecting means comprises:

a first sampling and holding circuit for holding and generating said second read signal value in accordance with said first gate signal;

a second sampling and holding circuit for holding and generating said second read signal value in accordance with said second gate signal; and a subtracting integrating circuit for calculating a difference between an output signal of said first sampling and holding circuit and an output signal of said second sampling and holding circuit and integrating said difference, thereby obtaining a value indicative of a balance of said crosstalks.

7. An optical pickup apparatus for optically reading signals recorded on the tracks of a recording medium, comprising:

signal reading means for simultaneously, individually, and optically reading the recording signals of at least three adjacent tracks on said recording medium in parallel and forming read signal values for the tracks at one end, center, and the other end of three tracks as first, second, and third read signal values, respectively;

comparing means for individually comparing said first and third read signal values with a first threshold value and a second threshold value that is larger than said first threshold value;

means for generating a first gate signal at a time point when said first read signal value is larger than said second threshold value and said third read signal value is larger than said second threshold value;

means for generating a second gate signal at a time point when said first read signal value is smaller than said first threshold value and said third read signal value is smaller than said first threshold value; and crosstalk amount detecting means for forming a difference between said second read signal value when said first gate signal is generated and said second read signal value when said second gate signal is generated as a value indicative of a crosstalk amount to the second read signal.

8. An apparatus according to claim 7, wherein said signal reading means corrects the crosstalk amount of each of said read signals in accordance with an output value of said crosstalk amount detecting means.

9. An apparatus according to claim 7, wherein said crosstalk amount detecting means comprises:

a first sampling and holding circuit for holding and generating said second read signal value in accordance with said first gate signal;

an inverter for inverting said second read signal;

a second sampling and holding circuit for holding and generating an output signal value of said inverter in accordance with said second gate signal; and an integrating adding circuit for adding a value obtained by integrating an output signal of said first sampling and holding circuit and a value obtained by integrating an output signal of said second sampling and holding circuit, thereby obtaining a value indicative of a balance of said crosstalks.

10. An apparatus according to claim 7, wherein said crosstalk amount detecting means comprises:

a first sampling and holding circuit for holding and generating said second read signal value in accordance with said first gate signal;

an inverter for inverting said second read signal;

a second sampling and holding circuit for holding and generating an output signal value of said inverter in accordance with said second gate signal; and an adding integrating circuit for adding an output signal of said first sampling and holding circuit and an output signal of said second sampling and holding circuit and integrating a value derived by said addition, thereby obtaining a value indicative of said crosstalk amount.

11. An apparatus according to claim 7, wherein said crosstalk amount detecting means comprises:

a first sampling and holding circuit for holding and generating said second read signal value in accordance with said first gate signal;

a second sampling and holding circuit for holding and generating said second read signal value in accordance with said second gate signal; and an integrating subtracting circuit for setting a difference between a value obtained by integrating an output signal of said first sampling and holding circuit and a value obtained by integrating an output signal of said second sampling and holding circuit into a value indicative of said crosstalk amount.

12. An apparatus according to claim 7, wherein said crosstalk amount detecting means comprises:

a first sampling and holding circuit for holding and generating said second read signal value in accordance with said first gate signal;

a second sampling and holding circuit for holding and generating said second read signal value in accordance with said second gate signal; and a subtracting integrating circuit for calculating a difference between an output signal of said first sampling and holding circuit and an output signal of said second sampling and holding circuit and integrating said difference, thereby obtaining a value indicative of said crosstalk amount.

13. An optical pickup apparatus for optically reading signals recorded on tracks of a recording medium, comprising:

signal reading means for simultaneously, individually, and optically reading the recording signals of at least three adjacent tracks on the recording medium in parallel and forming read signal values for the tracks at one end, center, and the other end of three tracks as first, second, and third read signal values, respectively;

comparing means for individually comparing said first and third read signal values with a first threshold value and a second threshold value that is larger than said first threshold value;

means for generating a first gate signal at a time point when said first read signal value is smaller than said first threshold value and said third read signal value is larger than said second threshold value;

means for generating a second gate signal at a time point when said first read signal value is larger than said second threshold value and said third read signal value is smaller than said first threshold value;

crosstalk balance detecting means for forming a difference between said second read signal value when said first gate signal is generated and said second read signal value when said second gate signal is generated as a value indicative of a balance level of the crosstalk to said second read signal;

means for generating a third gate signal at a time point when said first read signal value is larger than said second threshold value and said third read signal value is larger than said second threshold value;

means for generating a fourth gate signal at a time point when said first read signal value is smaller than said first threshold value and said third read signal value is smaller than said first threshold value; and crosstalk amount detecting means for forming a difference between said second read signal value when said third gate signal is generated and said second read signal value when said fourth gate signal is generated as a value indicative of a crosstalk amount to said second read signal.

14. An optical pickup apparatus for optically reading signals recorded on tracks of a recording medium, comprising:

signal reading means for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively;

first comparing means for generating a first gate signal when said first read signal value is smaller than said first threshold value;

second comparing means for generating a second gate signal when said first read signal value is larger than said second threshold value that is larger than said first threshold value;

delay means for individually delaying said first and second gate signals;

a first sampling and holding circuit to hold and generate said second read signal value when said first gate signal delayed by said delay means is generated;

a second sampling and holding circuit to hold and generate said second read signal value when said second gate signal delayed by said delay means is generated;

selecting means for obtaining a holding output value of said first sampling and holding circuit when said third read signal value is larger than said second threshold value and for obtaining a holding output value of said second sampling and holding circuit when said third read signal value is smaller than said first threshold value; and crosstalk balance detecting means for forming a difference between said holding output values of said first and second sampling and holding circuits as a value indicative of a balance level of the crosstalk to said second read signal.

15. An apparatus according to claim 14, wherein said crosstalk balance detecting means comprises:

first integrating means for integrating the holding output value of said first sampling and holding circuit derived by said selecting means;

second integrating means for integrating the holding output value of said second sampling and holding circuit derived by said selecting means; and subtracting means for calculating a difference between output signal values of said first and second integrating means, thereby obtaining a value indicative of a balance of said crosstalks.

16. An apparatus according to claim 14, wherein said crosstalk balance detecting means comprises:

subtracting means for calculating a difference between the holding output values of said first and second sampling and holding circuits derived by said selecting means; and integrating means for integrating an output signal of said subtracting means, thereby obtaining a value indicative of a balance of said crosstalks.

17. An optical pickup apparatus for optically reading signals recorded on tracks of a recording medium, comprising:

signal reading means for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively;

first comparing means for generating a first gate signal when said first read signal value is smaller than said first threshold value;

second comparing means for generating a second gate signal when said first read signal value is larger than a second threshold value that is larger than said first threshold value;

delay means for individually delaying said first and second gate signals;

a first sampling and holding circuit to hold and generate the second read signal value when said first gate signal delayed by said delay means is generated;

a second sampling and holding circuit to hold and generate the second read signal value when said second gate signal delayed by said delay means is generated;

selecting means for obtaining a holding output value of said first sampling and holding circuit when said third read signal value is smaller than said first threshold value and for obtaining a holding output value of said second sampling and holding circuit when said third read signal value is larger than said second threshold value; and crosstalk amount detecting means for forming a difference between said holding output values of said first and second sampling and holding circuits obtained by said selecting means as a value indicative of a crosstalk amount to said second read signal.

18. An apparatus according to claim 17, wherein said crosstalk amount detecting means comprises:

first integrating means for integrating the holding output value of said first sampling and holding circuit derived by said selecting means;

second integrating means for integrating the holding output value of said second sampling and holding circuit derived by said selecting means; and subtracting means for calculating a difference between output signal values of said first and second integrating means, thereby obtaining a value indicative of said crosstalk amount.

19. An apparatus according to claim 17, wherein said crosstalk amount detecting means comprises:

subtracting means for calculating a difference between the holding output values of said first and second sampling and holding circuits derived by said selecting means; and integrating means for integrating an output signal of said subtracting means, thereby obtaining a value indicative of said crosstalk amount.

20. An optical pickup apparatus for optically reading signals recorded on tracks of a recording medium, comprising:

signal reading means for simultaneously, individually, and optically reading recording signals of three adjacent tracks on the recording medium by three beams and forming read signal values for the tracks at one end in a preceding reading, center, and the other end in a delay reading among the three tracks as first, second, and third read signal values, respectively;

first comparing means for generating a first gate signal when said first read signal value is smaller than a first threshold value;

second comparing means for generating a second gate signal when said first read signal value is larger than a second threshold value that is larger than said first threshold value;

delay means for individually delaying said first and second gate signals;

a first sampling and holding circuit to hold and generate said second read signal value when said first gate signal delayed by said delay means is generated;

a second sampling and holding circuit to hold and generate the second read signal value when said second gate signal delayed by said delay means is generated;

selecting means for obtaining a holding output value of said first sampling and holding circuit when said third read signal value is larger than said second threshold value and for obtaining a holding output value of said second sampling and holding circuit when said third read signal value is smaller than said first threshold value;

crosstalk balance detecting means for forming a difference between said holding output values of said first and second sampling and holding circuits obtained by said selecting means as a value indicative of a balance level of the crosstalk to said second read signal; and crosstalk amount detecting means for forming a difference between said holding output values of said first and second sampling and holding circuits obtained by said selecting means as a value indicative of a crosstalk amount to said second read signal.

21. An optical pickup apparatus for optically reading signals recorded on tracks of a recording medium, comprising:

signal reading means for optically reading a recording signal of one track on the recording medium and generating the read signal as a first read signal value;

a memory to store said first read signal value generated from said signal reading means at a predetermined period;

means for reading out the read signal values corresponding to reading positions which are adjacent to the present reading position by said signal reading means by one track and two tracks on the side which has already been read as second and third read signal values from the plurality of first signal values stored in said memory;

comparing means for individually comparing said first and third read signal values with a first threshold value and a second threshold value that is larger than said first threshold value;

means for generating a first gate signal at a time point when said first read signal value is smaller than said first threshold value and said third read signal value is larger than said second threshold value;

means for generating a second gate signal at a time point when said first read signal value is larger than said second threshold value and said third read signal value is smaller than said first threshold value; and crosstalk balance detecting means for forming a difference between said second read signal value when said first gate signal is generated and said second read signal value when said second gate signal is generated as a value indicative of a balance level of a crosstalk to said second read signal.

22. An optical pickup apparatus for optically reading signals recorded on tracks of a recording medium, comprising:

signal reading means for optically reading the recording signal of one track on the recording medium and generating the read signal as a first read signal value;

a memory to store said first read signal value generated from said signal reading means at a predetermined period;

means for reading out the read signal values corresponding to reading positions which are adjacent to the present reading position by said signal reading means by one track and two tracks on the side which has already been read as second and third read signal values from the plurality of first signal values stored in said memory;

comparing means for individually comparing said first and third read signal values with a first threshold value and a second threshold value that is larger than said first threshold value;

means for generating a first gate signal at a time point when said first read signal value is larger than said second threshold value and said third read signal value is larger than said second threshold value;

means for generating a second gate signal at a time point when said first read signal value is smaller than said first threshold value and said third read signal value is smaller than said first threshold value; and crosstalk amount detecting means for forming a difference between said second read signal value when said first gate signal is generated and said second read signal value when said second gate signal is generated as a value indicative of a crosstalk amount to said second read signal.

23. An optical pickup apparatus for optically reading signals recorded on tracks of a recording medium, comprising:

signal reading means for optically reading the recording signal of one track on the recording medium and generating the read signal as a first read signal value;

a memory to store said first read signal value generated from said signal reading means at a predetermined period;

means for reading out the read signal values corresponding to reading positions which are adjacent to the present reading position by said signal reading means by one track and two tracks on the side which has already been read as second and third read signal values from the plurality of first signal values stored in said memory;

comparing means for individually comparing said first and third read signal values with a first threshold value and a second threshold value that is larger than said first threshold value;

means for generating a first gate signal at a time point when said first read signal value is smaller than said first threshold value and said third read signal value is larger than said second threshold value;

means for generating a second gate signal at a time point when said first read signal value is larger than said second threshold value and said third read signal value is smaller than said first threshold value;

crosstalk balance detecting means for forming a difference between said second read signal value when said first gate signal is generated and said second read signal value when said second gate signal is generated as a value indicative of a balance level of the crosstalk to said second read signal;

means for generating a third gate signal at a time point when said first read signal value is larger than said second threshold value and said third read signal value is larger than said second threshold value;

means for generating a fourth gate signal at a time point when said first read signal value is smaller than said first threshold value and said third read signal value is smaller than said first threshold value; and crosstalk amount detecting means for forming a difference between said second read signal value when said third gate signal is generated and said second read signal value when a fourth gate signal is generated as a value indicative of the crosstalk amount to said second read signal.

24. An optical pickup apparatus for optically reading signals recorded on tracks of a recording medium, comprising:

signal reading means for simultaneously, individually, and optically reading the recording signals of at least three adjacent tracks on said recording medium in parallel and forming read signal values for the tracks at one end, center, and the other end among said three tracks as first, second, and third read signal values, respectively;

comparing means for individually comparing said first and third read signal values with a first threshold value and a second threshold value that is larger than said first threshold value;

means for generating a first gate signal when said first read signal value is smaller than said first threshold value;

means for generating a second gate signal when said first read signal value is larger than said second threshold value;

means for generating a third gate signal when said third read signal value is smaller than said first threshold value;

means for generating a fourth gate signal when said third read signal value is larger than said second threshold value;

first crosstalk amount detecting means for forming a difference between said second read signal value when said first gate signal is generated and said second read signal value when said second gate signal is generated as a value indicative of a first crosstalk amount to the center track from the track at one end; and second crosstalk amount detecting means for forming a difference between said second read signal value when said third gate signal is generated and said second read signal value when said fourth gate signal is generated as a value indicative of a second crosstalk amount to the center track from the track at the other end.

25. An apparatus according to claim 24, wherein said signal reading means corrects said second read signal in accordance with the output values of said first and second crosstalk amount detecting means and generates a corrected signal.

26. An optical pickup apparatus for optically reading signals recorded on tracks of a recording medium, comprising:

signal reading means for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively;

comparing means for individually comparing said first and third read signal values with a first threshold value and a second threshold value that is larger than said first threshold value;

means for generating a first gate signal when said first read signal value is smaller than said first threshold value;

means for generating a second gate signal when said first read signal value is larger than said second threshold value;

means for generating a third gate signal when said third read signal value is smaller than said first threshold value;

means for generating a fourth gate signal when said third read signal value is larger than said second threshold value;

first crosstalk amount detecting means for forming a difference between said second read signal value when said first gate signal is generated and said second read signal value when said second gate signal is generated as a value indicative of a first crosstalk amount to the center track from the track at one end; and second crosstalk amount detecting means for forming a difference between said second read signal value when said third gate signal is generated and said second read signal value when said fourth gate signal is generated as a value indicative of a second crosstalk amount to the center track from the track at the other end.

27. An apparatus according to claim 26, wherein said signal reading means corrects said second read signal in accordance with the output values of said first and second crosstalk amount detecting means and generates a corrected signal.

28. An optical pickup apparatus for optically reading signals recorded on tracks of a recording medium, comprising:

signal reading means for optically reading the recording signal of one track on the recording medium and generating the read signal as a first read signal value;

a memory to store said first read signal value generated from said signal reading means at a predetermined period;

reading means for reading out the read signal values corresponding to reading positions which are adjacent to the present reading position by said signal reading means by one track and two tracks on the side which has already been read as second and third read signal values from the plurality of first signal values stored in said memory;

comparing means for individually comparing said first and third read signal values with a first threshold value and a second threshold value that is larger than said first threshold value;

means for generating a first gate signal when said first read signal value is smaller than said first threshold value;

means for generating a second gate signal when said first read signal value is larger than said second threshold value;

means for generating a third gate signal when said third read signal value is smaller than said first threshold value;

means for generating a fourth gate signal when said third read signal value is larger than said second threshold value;

first crosstalk amount detecting means for forming a difference between said second read signal value when said first gate signal is generated and said second read signal value when said second gate signal is generated as a value indicative of a first crosstalk amount to the center track from the track at one end among said three adjacent tracks; and second crosstalk amount detecting means for forming a difference between said second read signal value when said third gate signal is generated and said second read signal value when said fourth gate signal is generated as a value indicative of a second crosstalk amount to the center track from the track at the other end among said three adjacent tracks.

29. An apparatus according to claim 28, wherein said reading means corrects said second read signal in accordance with the output values of said first and second crosstalk amount detecting means and generates a corrected signal.

30. An optical pickup apparatus for optically reading signals recorded on tracks of a recording medium, comprising:

signal reading means for simultaneously, individually, and optically reading the recording signals of at least three adjacent tracks on the recording medium in parallel and forming read signal values for the tracks at one end, center, and the other end among the three tracks as first, second, and third read signal values, respectively;

comparing means for individually comparing said first and third read signal values with a first threshold value or a second threshold value that is larger than said first threshold value;

means for generating a first gate signal when said first read signal value is smaller than said first threshold value or is larger than said second threshold value;

means for generating a second gate signal when said third read signal value is smaller than said first threshold value or is larger than said second threshold value;

means for obtaining a fourth read signal value in which only an A/C component of said second read signal value is extracted;

first crosstalk amount detecting means for forming said fourth read signal value when said first gate signal is generated as a value indicative of a first crosstalk amount to the center track from the track at one end; and second crosstalk amount detecting means for forming said fourth read signal value when said second gate signal is generated as a value indicative of a second crosstalk amount to the center track from the track at the other end.

31. An apparatus according to claim 30, wherein said means for obtaining said fourth read signal value corrects said fourth read signal in accordance with the output values of said first and second crosstalk amount detecting means and generates a corrected signal.

32. An optical pickup apparatus for optically reading signals recorded on tracks of a recording medium, comprising:

signal reading means for simultaneously, individually, and optically reading the recording signals of three adjacent tracks on the recording medium by three beams and forming read signal values for the tracks at one end in a preceding reading, center, and the other end in a delay reading among the three tracks as first, second, and third read signal values, respectively;

comparing means for individually comparing said first and third read signal values with a first threshold value or a second threshold value that is larger than said first threshold value;

means for generating a first gate signal when said first read signal value is smaller than said first threshold value or is larger than said second threshold value;

means for generating a second gate signal when said third read signal value is smaller than said first threshold value and said first read signal value is larger than said second threshold value;

means for obtaining a fourth read signal value in which only an A/C component of said second read signal value is extracted;

first crosstalk amount detecting means for forming said fourth read signal value when said first gate signal is generated as a value indicative of a first crosstalk amount to the center track from the track at one end; and second crosstalk amount detecting means for forming said fourth read signal value when said second gate signal is generated as a value indicative of a second crosstalk amount to the center track from the track at the other end track.

33. An apparatus according to claim 32, wherein said means for obtaining said fourth read signal value corrects said fourth read signal in accordance with the output values of said first and second crosstalk amount detecting means and generates a corrected signal.

34. An optical pickup apparatus for optically reading signals recorded on tracks of a recording medium, comprising:

signal reading means for optically reading the recording signal of one track on the recording medium and generating the read signal as a first read signal value;

a memory to store said first read signal value generated from said signal reading means at a predetermined period;

reading means for reading out the read signal values corresponding to reading positions which are adjacent to the present reading position by said signal reading means by one track and two tracks on the side which has already been read as second and third read signal values from the plurality of first signal values stored in said memory;

comparing means for individually comparing said first and third read signal values with a first threshold value or a second threshold value that is larger than said first threshold value;

means for generating a first gate signal when said first read signal value is smaller than said first threshold value or is larger than said second threshold value;

means for generating a second gate signal when said third read signal value is smaller than said first threshold value or is larger than said second threshold value;

means for obtaining a fourth read signal value in which only an A/C component of said second read signal value is extracted;

first crosstalk amount detecting means for forming said fourth read signal value when said first gate signal is generated as a value indicative of a first crosstalk amount to the center track from the track at one end among said three adjacent tracks; and second crosstalk amount detecting means for forming said fourth read signal value when said second gate signal is generated as a value indicative of a second crosstalk amount to the center track from the track at the other end among said three adjacent tracks.

35. An apparatus according to claim 34, wherein said means for obtaining said fourth read signal value corrects said fourth read signal in accordance with the output values of said first and second crosstalk amount detecting means and generates a corrected signal.

* * * * *